United States Patent [19]

Caltagirone et al.

[11] 4,217,646
[45] Aug. 12, 1980

[54] AUTOMATIC CONTROL SYSTEM FOR A BUILDING

[75] Inventors: Anthony V. Caltagirone; George J. Bradford, both of York, Pa.; James J. Parro, Skaneateles, N.Y.

[73] Assignee: The Singer Company, Stamford, Conn.

[21] Appl. No.: 971,980

[22] Filed: Dec. 21, 1978

[51] Int. Cl.² .................. G05D 23/32; H04Q 7/00
[52] U.S. Cl. ............................ 364/493; 165/22; 236/91 D; 237/2 A; 455/152; 340/310 R; 364/107; 364/900
[58] Field of Search ............... 364/400, 492, 493, 483, 364/200, 900, 418, 104, 107; 340/310 R, 310 A; 236/91 D, 91 E, 91 F, 46 R, 46 C; 237/2 R, 2 A; 325/301, 302, 310, 314; 219/490, 494, 509, 510; 307/39, 38, 52, 116, 117; 165/13, 14, 22, 32

[56] References Cited

U.S. PATENT DOCUMENTS

| | | | |
|---|---|---|---|
| 3,964,676 | 6/1976 | Rooks et al. | 236/46 R |
| 3,971,010 | 7/1976 | Foehn | 340/310 A |
| 3,971,028 | 7/1976 | Funk | 340/310 A |
| 4,023,043 | 5/1977 | Stevenson | 364/493 |
| 4,071,745 | 1/1978 | Hall | 364/104 |
| 4,110,632 | 8/1978 | Wyland | 236/46 R |
| 4,114,141 | 9/1978 | Travis | 340/310 A |
| 4,167,786 | 9/1979 | Miller et al. | 364/493 |

*Primary Examiner*—Errol A. Krass
*Attorney, Agent, or Firm*—Charles R. Lewis

[57] ABSTRACT

An automatic system for controlling the environmental conditions in a building divided into a plurality of zones includes a control station that sends control signals over the power lines of the building to control power consuming appliances in the various zones. The control station includes a programmable computer that is operably coupled to various displays and control switches on a control panel. In one mode of operation the switches and displays are utilized to program a schedule into the computer for controlling the various power consuming appliances such as heating and airconditioning units, lights, machinery and the like in order to provide a desired environment within the various zones of the building. In another mode of operation the displays on the control panel provide operator information as to the programmed schedule for the zones whereas the switches on the control panel enable the schedule stored within the programmed computer to be selectively overridden to accommodate changing conditions, such as holidays and the like, where newly desired environmental conditions in the various zones of the building differ from the schedule stored within the programmed computer. The system has the capability of automatically advancing the scheduled start up time of heating units dependent upon the difference between the temperature outside the building and a reference temperature in order to insure that environmental conditions in the various zones of the building are at a desired level at the time of occupancy.

52 Claims, 34 Drawing Figures

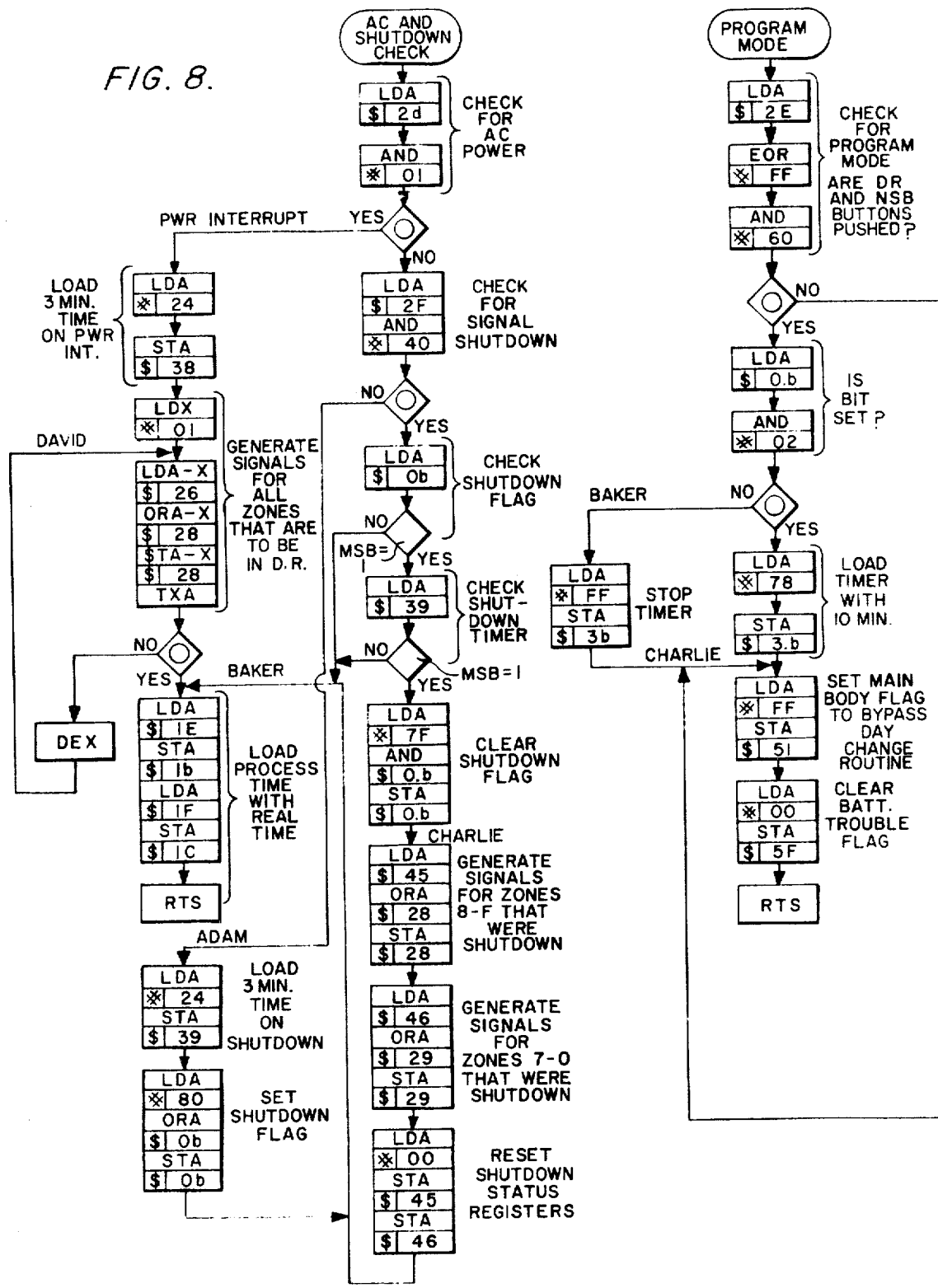

AUTOMATIC CONTROL SYSTEM FOR A BUILDING

BACKGROUND OF THE INVENTION

1. Field of the Invention

The subject invention relates to automatic control systems and more particularly to control systems for automatically controlling the environmental conditions within a building with electrical power consuming appliances.

2. Description of the Prior Art

The increased cost of energy has made it highly desirable that the power consumming appliances within a building be efficiently controlled. These appliances, such as heating and air-conditioning units, electric lighting, and other electrical appliances, affect the environment within the building in which the occupants thereof must perform their various functions. Prior art mechanical, electromechanical and electronic systems exist for automatically controlling power consumming appliances in a building. However, these prior art systems have one or more disadvantages which are not found in the system of the present invention. The present invention relates to an improved system for automatically controlling the environment in a building and which can be used in existing buildings or which can be installed as a building is being constructed. Solid state circuitry is utilized to gain reliability and the system is easily programmed by the user by way of a control station which includes a control panel that has displays and manually actuatable switches. In one mode of operation the displays and switches are utilized to enter a desired schedule into the control station for controlling the various power consumming appliances throughout the building. In another mode of operation the displays provide information as to the schedule stored within the control station and the manually actuatable switches can be utilized to override the stored schedule to accomodate changing conditions to provide a great degree of flexibility. The system will automatically advance the start up time for heating units dependent upon the difference between the temperature outside the building and a predetermined reference temperature. This insures that various zones within the building are at a comfortable temperature at the time that they are occupied.

SUMMARY OF THE INVENTION

These and other features and advantages of the present invention are accomplished in an automatic system that controls the environmental conditions in a building divided into a plurality of zones by utilizing at least one power consuming appliance in each zone. The building includes power lines for supplying electrical operating power to the appliances. A control station includes means for applying appliance control signals onto the power lines that include bursts of radio frequency oscillations having a predetermined frequency and a predetermined duration. The frequency of the control signals identifies the zone in which appliances are to be controlled and the duration of the control signals identifies the function that is to be performed by the appliances in the identified zone. A receiver coupled between each appliance and the power lines receives the control signals and operates the appliances in the zone response thereto by turning the appliances on or off. Each receiver in a zone is responsive only to the control signals having a frequency associated with the zone in which the receiver is located. The control station includes a programmable computer for generating the control signals in a predetermined manner. The control station also includes manually actuatable means coupled to the computer for overriding the predetermined appliance control data stored in the programmed computer. At least some of the manually actuatable means are also utilized for storing control data into the programmed computer in accordance with a predetermined schedule for controlling the appliances within the zones of the building. The programmed computer also includes means for sensing the temperature outside the building and comparing the same with a reference temperature to automatically determine the amount of advanced start up time necessary to provide the desired temperatures in the various zones of the building at the beginning of a work day.

BRIEF DESCRIPTION OF THE DRAWINGS

The present invention will be fully understood from consideration of the following detailed description taken in conjunction with the accompanying drawings, in which like reference character refer to like or similar parts in the several views, and wherein;

FIGS. 7A, 7B, 8, 9A, 9B, 10A, 10B, 10C, 10D, 11A, 11B, 11C, 11D, 11E, 11F, 11G, 11H, 11I, 12A, 12B, 13 are flow charts which illustrate in detail some of the subroutines that are included within the main body flow chart of FIGS. 6A and 6B;

Referring now to FIG. 1 it is seen that three phase power in a building 49 is supplied to power lines 51 from a central power transformer 50. Each floor of the building 49 has at least one power consuming appliance 53 coupled to the power lines 51. The power consumming appliances 53 can be any electrically operated unit such as lights, electrical machinery, heating units and the like. However, for purposes of describing the present invention, the power consumming appliances 53 will be considered to be heating and air-conditioning units.

The units 53 in the building 49 are divided into a plurality of zones. A zone includes all those units 53 which are turned on and then turned off at substantially the same time for selected days of the week. A zone can include all of the units 53 on one or more floors or part of the units 53 on a floor or floors. Also, a zone can contain one unit 53 or a plurality of units 53. Additionally, the units 53 in different zones can be turned on at substantially the same time or turned off at substantially the same time or turned on and off at substantially the same time. A zone may include an entry way, hallways, office space having the same starting and quitting times, and the like. As will be apparent the ability to automatically control the units 53 in a zone independently of the units 53 in the other zones permits a wide degree of flexibility in operating the power consumming units 53 in the building 49 in a manner to enable the conservation of energy. In accordance with the embodiment of the invention which is described herein in detail, sixteen different zones in a building 49 can be controlled independently of one another. In FIG. 1, each floor is illustrated as constituting a single zone for purposes of illustration.

Figure 3:
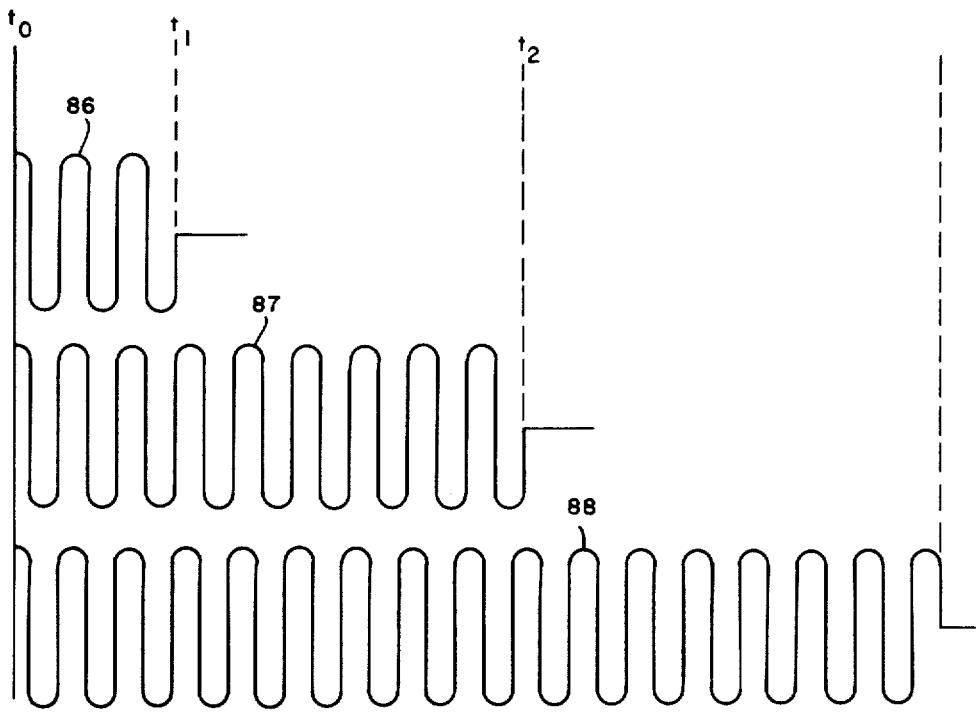
FIG. 3 illustrates typical power consumming appliance control signals which are generated in the system illustrated in FIG. 1.

Control signals for turning the units 53 on and off are coupled to the power lines 51 from a control station 52 by way of three capacitors 59. A day run signal (hereinafter called a turn on signal) turns each unit 53 in a selected zone on whereas a night set back signal (hereinafter called a turn off signal) turns off each unit 53 in a selected zone. The frequency of the control signal determines which zone is selected and the duration of the control signal determines whether the units 53 in the selected zone are to be turned off or to be turned on. For example, as shown in FIG. 3, a turn off signal 87 has a duration which is less than half of a turn on signal 88. In accordance with the embodiment of the invention described herein, the turn off signal 87 has a duration of about 10 seconds. and the turn on signal 88 has a duration of about 60 seconds. The control station 52 includes a panel 83 which has a plurality of displays and dual function control/programming switches which are coupled to and interact with a programmable computer (FIG. 4) contained within the control station 52.

Coupled in series between each unit 53 and the power lines 51 is a receiver 56 which responds to the turn off 87 and turn on 88 signals to correspondingly control its associated unit 53. The receivers may be an integral part of each unit 53. Each receiver 56 in a zone responds only to those control signals having the frequency associated with that zone. Once turned on, the units 53 in a zone can be controlled by a thermostat 54 coupled thereto in a well known manner by leads 55. Coupled to each receiver is a manually actuatable override switch 58 which enables the associated unit 53 to be turned on when the unit 53 has been turned off by the control station 52. This enables late working personnel, and others, to turn on a unit 53 when it is desirable to do so even though it has been turned off automatically by the control station 52. Once turned off by the control station 52, however, the control station 52 will periodically send out turn off signals 87 to the zone until the units 53 in the zone are again turned on by a turn on signal 88. In accordance with the specific embodiment described herein the turn off signal 87 is generated every even hour until the scheduled turn on signal 88 is generated. Accordingly, a unit 53 turned on by the override switch 58 will again be turned off by the control station 52. This feature prevents a unit 53 from inadvertently being left on during the night after it has been turned on by actuation of the override switch 58 by a person working late or by some other individual. Each receiver 56 includes a temperature sensing element 57 which, once the associated unit 53 has been turned off, enables the unit 53 to be turned on again to provide heat in the event that the temperature at the receiver 56 falls below a predetermined minimum temperature. As will be apparent, this prevents a freeze during the cold weather months.

Figure 1:
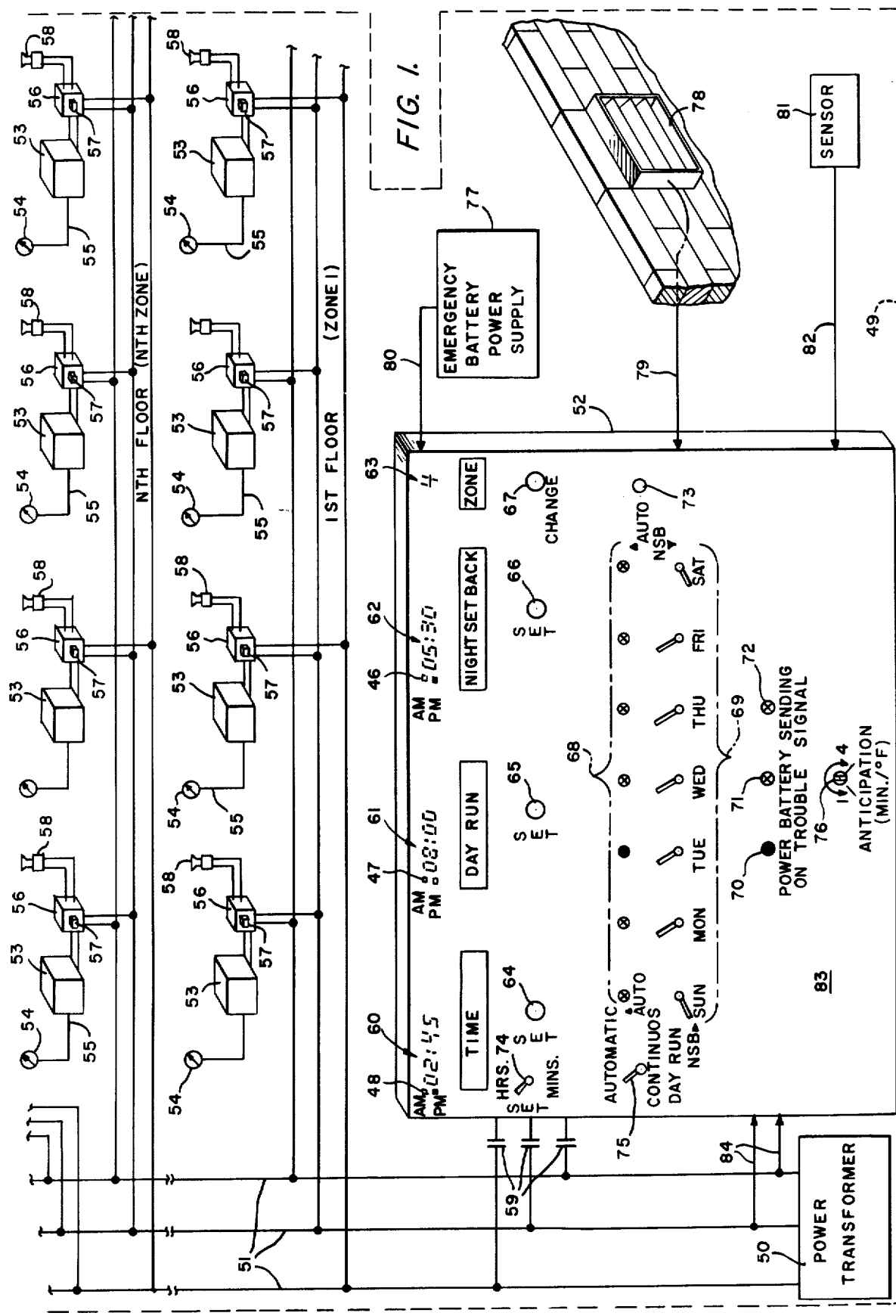
FIG. 1 is a block diagram of a preferred embodiment of the automatic control system in accordance with the present invention and which shows the various displays and switches on a panel of a control station.
Figure 4:
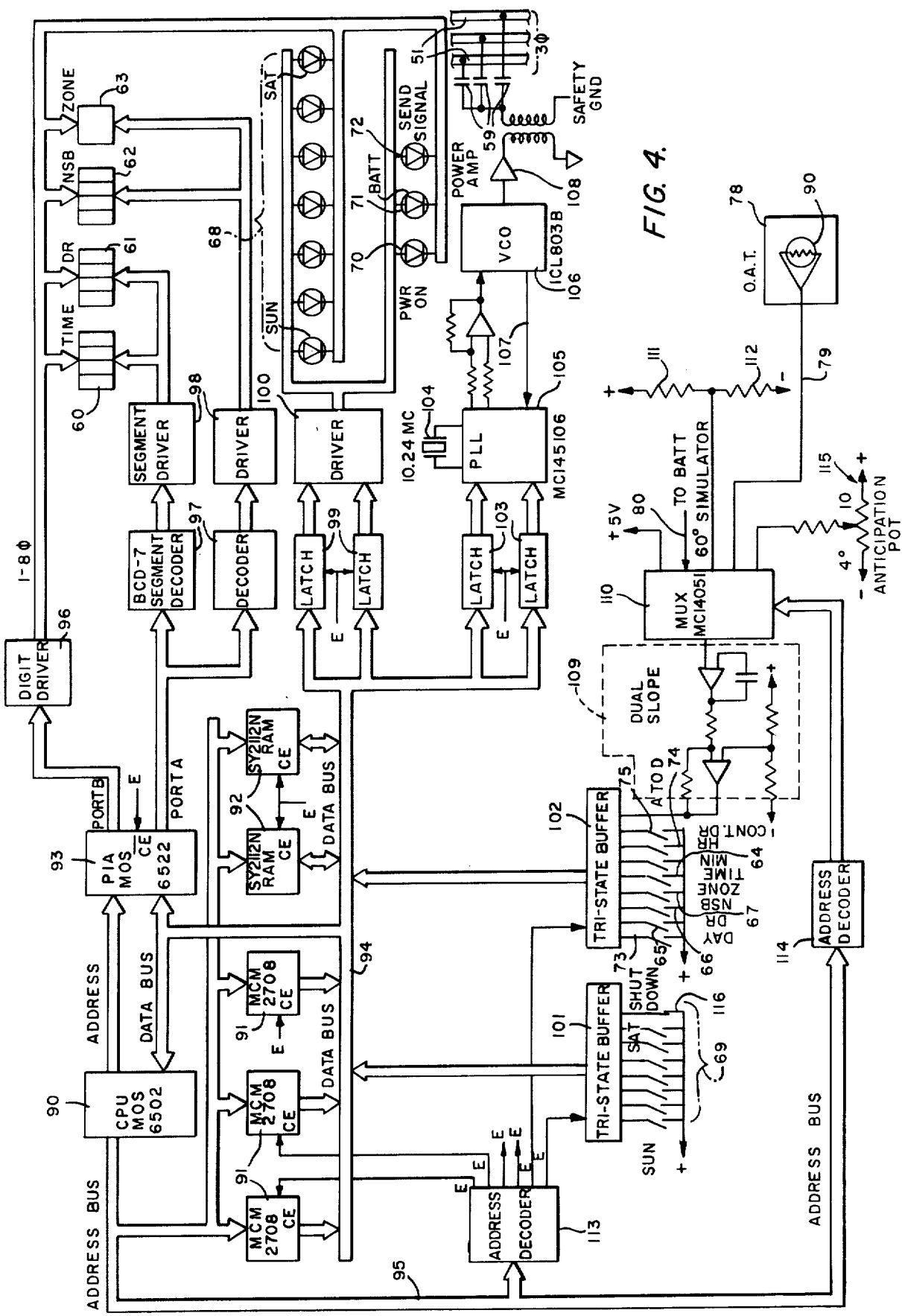
FIG. 4 is logic block diagram of the programmable computer contained within the control station of the system illustrated in FIG. 1 and shows the various inputs and outputs of the programmed computer.

The panel 83 includes a digital display 60 marked TIME which constitutes a twelve hour time of the day clock with AM/PM dot indicators 48 and which reads in hours and minutes. The time display is kept internally within the programmed computer (FIG. 4). A single digit display 63 marked ZONE indicates the zone which has its turn on and turn off times shown in the other displays 61 and 62. The zone digit displayed can be any number zero through nine or any of the letters of the alphabet A through F to provide a total of sixteen zone identification symbols. A second digital display 61 reading in hours and minutes and having AM/PM dot indicators 47 and marked DAY RUN indicates the time of day at which the units 53 in the zone indicated in the zone display 63 will be turned on. A third digital display 62 reading in hours and minutes and having AM/PM dot indicators 46 and marked NIGHT SETBACK indicates the time of day at which the units 53 in the zone indicated in the zone display 63 will be turned off. The units 53 in the displayed 63 zone will be turned on and off under the control of the programmed computer (FIG. 4) contained within the control station 52. Seven indicator lights 68 are provided for the seven days of the week and constitute a seven day clock with the lighted indicator 68 giving the correct day. For example, as shown in FIG. 1 the day of the week is shown as being Tuesday and the time is 2:45 PM. Although shown in FIG. 1 as being coupled to the three phase power lines 51, the control station 52 is preferrably powered from a separate single phase supply (not shown). When line power is on and the system is operating, a power on indicator 70 is lit. When this indicator 70 is not lit, line power is not present and the programmed time schedules for turning the units 53 in the various zones on and off will be retained in a memory contained within the programmed computer (FIG. 4) for a period of time determined by the capability of an emergency battery 77 power supply contained within and coupled to the control station 52 by leads 80. The emergency battery 77 is periodically tested under the control of the programmed computer (FIG. 4) to insure that it contains a complete charge and is operable. A battery trouble indicator 71 will be caused to flash on and off when the emergency battery needs replacement due to some fault therewith. In accordance with the specific embodiment described herein, the emergency battery is tested daily at 6 AM. A sending signal indicator 72 will lite whenever the control station 52 transmits a turn off 87 or a turn on 88 signal to any of the plurality of zones. In accordance with the embodiment described herein, during the first few seconds when a control signal is transmitted to a zone, the zone display 63 will flash on and off and display the zone which is to receive the control signal and, if a turn on signal, the day run display 61 will flash on and off with the preselected time setting and the night set back display 62 will flash with all zeros, and; if a turn off signal, the night set back display 62 will flash on and off with the preselected time setting and the day run display 61 will flash all zeros.

Located below and to the left of the time display 60 is a two position set hours/minutes switch 74. Pushing the switch 74 up to the hours position enables the hours in the displays 60, 61 or 62 to be advanced whereas pushing the switch 74 down to the minutes position enables the minutes in the displays 60, 61 or 62 to be advanced. Located immediately under the time display 60 is a time set push button 64. By first moving the set hours/minutes 74 into the appropriate hours or minutes position and then pressing the time set push button 64, the hours and minutes shown in the time of day display 60 may be advanced to the correct time. Located immediately below the day run display 61 is a day run set push button 65. The day run time display 61 may be adjusted by the use of the set hours/minutes switch 74 and the day run set push button 65 in a manner as described above for adjusting the time shown in the time of day display 60. Located immediately below the night set back display 62 is a night set back set, push button 66. This button is used in the same manner in conjunction with the set hours/minutes switch 74 to adjust the time in the night set back display 62. Located immediately below the zone display is a zone change push button 67. Pressing and holding this button down will cause the zone display 63 to advance approximately two zones/per second. Releasing the zone change push button 67 will freeze the zone readout 63 to display the selected time. As described above, the turn on and turn off times shown in the day run and night set back displays 61 and 62, respectively, are for the zone shown in the zone display 63.

Accordingly, the turn on and turn off times for the various zones can be checked by merely depressing the zone change push button 67. Located immediately below each day of the week indicator 68 is a two position day of the week switch 69. When a day of the week switch 69 is placed in the up or automatic position the units 53 for that day in all of the zones are controlled by the programmed computer contained within the control station 52 unless overridden by the automatic/continuous day run switch 75 described below. However, whenever a day of the week switch 69 is moved to the down or night setback position, the units 53 in all of the zones will remain off for that particular day except when overridden by the automatic/continuous day run switch 75. During normal operation, the day of the week switches 69 enable an override of the schedule contained in the programmed computer (FIG. 4) within the control station 52. For example, assume a Monday Holiday. By simply placing the day of the week switch 69 for Monday down to the night setback position when leaving work on Friday, all of the units 53 in all of the zones will remain turned off on Monday. The Monday day of the week switch 69 can be returned to its normal automatic, or up, position on any day of the following week after the Monday holiday. Located to the left of the seven day of the week indicators 68 is an automatic/continuous day run switch 75. When in the up or automatic position the units 53 in the zones are controlled by the schedule in the programmed computer (FIG. 4) and the seven day of the week switches 69.

Moving the automatic/continuous switch 75 down to the continuous position will override the programming within the computer (except for the conditions explained below), and also the positions of the seven day of the week switches 69, to turn on all of the units 53 in all of the zones. As shown in FIG. 1 the automatic/continuous day run switch 75 is normally placed in its automatic position. The Saturday and Sunday day of the week switches 69 are normally placed into the night set back position whereas the Monday through Friday day of the week switches 69 are normally placed in their automatic position. For this set up, all of the units 53 in all of the zones will be turned off on Saturdays and Sundays whereas the units 53 in the various zones will be controlled in accordance with the schedule the programmed computer (FIG. 4) within the control station 52 during Mondays through Fridays.

Located to the right of the day of the week indicators 68 is a day change push button 73. The correct day of the week as shown by the day of the week indicators 68 is set by depressing the day change push button 73 which will cause the lighted day of the week indicator 68 to advance. By releasing the push button 73 when the correct day has been reached, the correct day of the week is set into the seven day clock.

Depending upon the temperature outside of the building 49, it is sometimes desirable to turn on the units 53 in one or more zones prior to the predetermined time set in order to allow the zones to be brought up to a comfortable temperature before workers or other personnel arrive. The control station 52, under the control of the programmed computer (FIG. 4) compares the temperature outside of the building with a reference temperature and will automatically turn on the units 53 in a zone prior to the time scheduled by an amount that varies with the difference between the temperature outside of the building 49 and the reference temperature. Located below the battery trouble indicator 71 is a screwdriver adjustment 76 marked "anticipation". In accordance with the specific embodiment of the present invention described herein, the control station 52 compares the temperature outside the building 49 to a reference of 60° F. and will turn on the units 53 in a zone prior to the time scheduled by an amount that varies between one minute and four minutes for each °F. difference between the outside temperature and 60° F. By turning the anticipation adjustment 76 fully counter-clockwise, the advanced turn on time is one minute for each °F. difference whereas turning the anticipation adjustment 76 fully clockwise provides four minutes of advanced turn on time for each °F. difference. Intermediate settings will provide early turn on time of between one and four minutes per °F. difference between the outside temperature and 60° F. The temperature outside the building 49 is provided by an outdoor air sensor 90 (FIG. 4) which is mounted within a weather proof box 78. The box 78 should be mounted on the outside of the North wall of the building 49; if mounted on any other face of the building 49 the box 78 must be shielded from direct sunlight in order that the temperature sensor 90 will read the outdoor temperature correctly. The outdoor air temperature signal is coupled to the control station 52 by a pair of twisted leads 79. In the system described herein only advanced heating is provided. However, as will be apparent to those skilled in the art advanced cooling can be accomplished in a similar manner.

Depending upon the type of heating or air-conditioning system utilized in the building 49, such as a closed water system, it is sometimes desirable to sense for abnormal conditions such as an unusually or dangerously high water temperature. When such a condition occurs it is desirable that the system be shut down automatically. As shown in FIG. 1, an abnormal condition sensor 81 is shown coupled to the control station 52 by leads 82. Once an abnormal condition is sensed, a shut down signal 86 (FIG. 3) is sent to the affected zones to lock out the units 53 therein. As shown in FIG. 3, the shut down signal 86 has a duration less than that of the turn-off signal 87 and, in accordance with the embodiment of the invention described herein has a duration of about 3 or 4 seconds. In accordance with the embodiment of the present invention described herein, only those zones which include anticipation in their schedule are subject to being locked out in response to the occurrence of a shut down signal 86. Once locked out, the units 53 can only be turned on manually.

As will now be apparent, the system in FIG. 1 allows the units 53 in the various zones of the building 49 to be automatically controlled by the programmed computer FIG. 4) within the control station 52. However, by use of the day of the week switches 69 and the automatic/continuous day run switch 75 the schedule within the programmed computer can be manually overridden by an operator. This allows a great deal of flexibility for maintaining enviromental conditions within the various zones at a desired level in an economical, reliable and simple manner.

Figure 2:
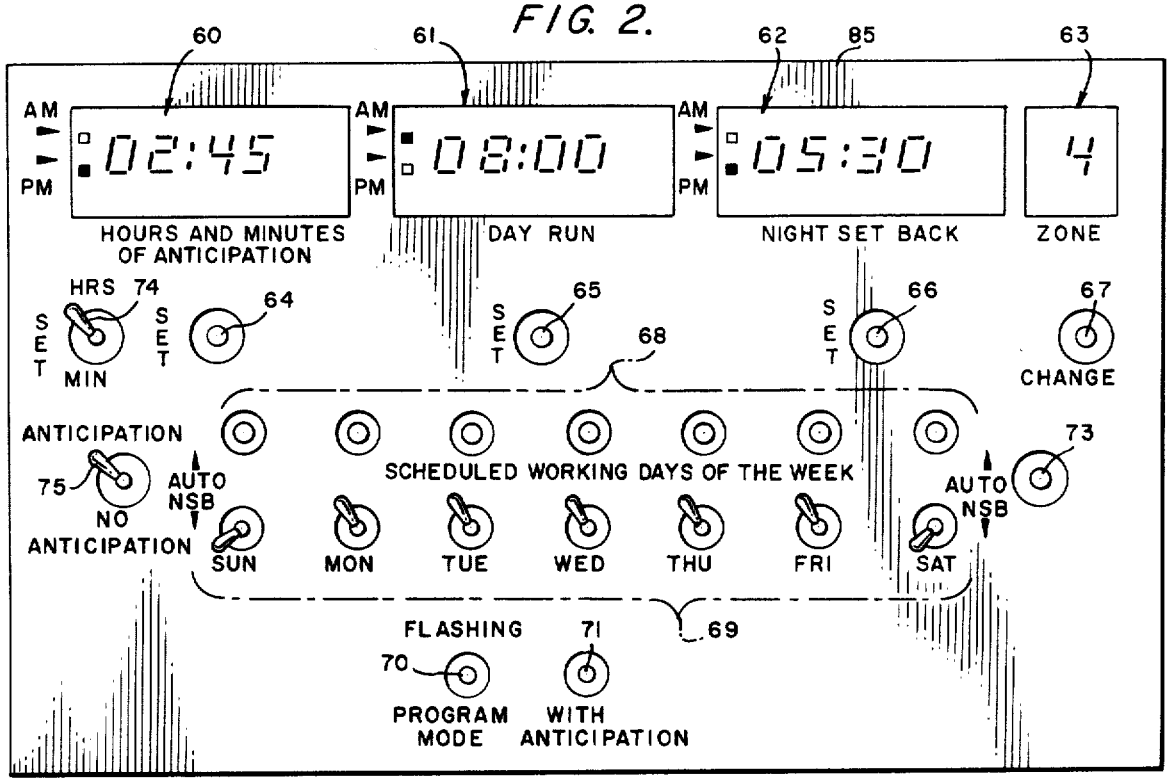
FIG. 2 illustrates an overlay which is placed over the panel illustrated in FIG. 1 when the system in FIG. 1 is programmed by way of the switches and displays illustrated in FIG. 1.

The schedule for the various zones is placed into the programmed computer (FIG. 4) by means of the various switches and displays on the control panel 83. In other words the various switches and displays serve a dual function; i.e. (1) to show and control the system illustrated in FIG. 1 once the computer contained herein has been programmed and (2) to program the computer within the control station 52 to provide the desired schedule for the various zones. In accordance with the embodiment of the present invention described herein, when using the control panel 83 to program the computer (FIG. 4) an apertured overlay 85 (FIG. 2) is placed over the panel 83 to enable the programmer to more readily comprehend the function of the switches. A panel 83 with the overlay 85 is illustrated in FIG. 2. When in the program mode, the time display 60 will now show the hours and minutes of anticipation, if any, for the zone indicated in the zone display 63. If a zone has been programmed for anticipation, this readout 60 will indicate the amount of advanced start up time, for the current outdoor temperature. For example, if the display 60 is indicating 1:30 and the day run or start up time 61 was programmed for 8:00 AM the actual start up time for the zone displayed 63 would be 6:30 AM. The automatic/continuous day run switch 75 located to the left of the seven day of the week indicators 68 is an anticipation/no anticipation switch 68 during programming and is set in the up or anticipation position when it is desired to have advanced start up time in a particular zone. It is set in the lower position if it is not desired to have any advanced start up time in a particular zone. This would generally be so when the units 53 in a zone contain other than heating and/or air-conditioning units such as lights or other electrical appliances. In the programming mode the seven day of the week switches 69 are utilized to allow programming of that day to follow or not to follow the times set in the day run and night set back displays 61 and 62, respectively. Setting a day of the week switch 69 to the lower or night set back position will now allow the units 53 in the zone displayed 63 for that day of the week to follow the schedule set in these displays 61 and 62. Rather, the units 53 in the zone being programmed will be turned off for that day. The day change push button 73 becomes an enter schedule push button 73 and is located to the right of the day of the week indicators 68. After selecting anticipation or no anticipation and the desired days of the week that are to follow the turn on and turn off times displayed 61 and 62, this push button 73 is pressed to enter the selected schedule into the programmable computer (FIG. 4). The days of the week programmed will be displayed after pressing this push button 73 to reflect the new or revised schedule for the zone indicated in the zone display 63. The battery trouble indicator 71 now indicates whether the zone shown in the zone display 63 contains anticipation. This indicator 71 will light if the displayed zone 63 has previously been programmed for anticipation and will light when the revised schedule is entered into the programmable computer (FIG. 4) and contains anticipation.

Before entering the program mode, the time display 60 should show the correct time of day and the correct day of week should be indicated 68 as described above in the seven day clock. The programming mode is entered by simultaneously pressing and then releasing the day run and night set back push buttons 65 and 66 respectively. This causes the power on indicator light 70 to flash indicating that the system is in the programming mode. The zone change push button 67 is then depressed until the zone desired to be programmed is displayed 63. The time at which the units 53 in the displayed 63 zone are to be turned on is set into the day run display 61 by actuating the set hours/minutes switch 74 and the day run set/push button 65 as described hereinabove. After the turn on time for the units 53 in the displayed 63 zone is set into the night setback display 62 by actuation of the set hours/minutes switch 74 and the night set back push button 66 as described above. By placing the day of the week switches 69 up to the automatic position or down to the night set back position, the zone schedule for the entire week can be programmed into the computer (FIG. 4). For example, if the units 53 in the zone displayed 63 are not to be turned on on Saturday and Sunday the Saturday and Sunday day of the week switches 69 are placed in their down or night setback position. However, if the units 53 in the zone are to be controlled by the times set into the day run and night setback displays 61 and 62, respectively, the corresponding day of the week switches 69 are placed in the up or automatic position. Typically, the day of the week switches 69 for Monday through Friday will be placed in the up or automatic position so that the units 53 will be turned on and off in accordance with the times set in the day run and night set back displays 61 and 62. If it is desired to have the units 53 in the zone displayed 63 have advance start up time, the anticipation/no anticipation switch 75 is placed in the up or anticipation position. The amount of advance start up time, or anticipation per °F. difference can now be adjusted by means of the screwdriver adjustment 76. Now that the weekly schedule for the displayed 63 zone has been set, the schedule can be entered into the programmable computer (FIG. 4) by actuating the enter schedule push button 73.

The above procedure is repeated for each zone by setting the zone display 63 to the next zone by actuating the zone push button 67 and repeating the steps described above. To leave the program mode once the last schedule has been entered, all of the day of the week switches 69 are placed up to the automatic position and the anticipation switch 75 is placed in the up position. By simultaneously pressing and releasing the day run and night setback push buttons 61 and 62 the power on light 70 will stop flashing to indicate that the system is no longer in the program mode. In accordance with the embodiment described herein, there is a built in ten minute time limit after entering the program mode after which the control station 52 will automatically revert to normal operation. Should additional time be required for programming, the program mode must be entered again by depressing the two push buttons 61 and 62 described above to secure an additional ten minutes of programming time. For any reason, such as when the space is not being utilized, zones may be omitted from the schedule such that they are skipped. This is accomplished by setting zeroes into the hour designations of both the day run and night setback displays 61 and 62 for the zone or zones that are to be skipped. A zone may be programmed to be in a continuous off condition by setting the day run display 61 to a zero hour configuration and setting the night setback display 62 to any time other than zero hours. For this condition a turn off signal 87 will be set to the zone every even hour. If desired, one or more zones may be programmed to be continuously in an on condition. This is accomplished by setting the night setback display 62 to zero hours and the day run display 61 to any hour other than zero hours. When so programmed, the automatic/continuous day run switch 75 when placed in the continuous day run position will have no affect on skipped zones or zones locked into a continuous off condition. The turn on signal 88 will be sent each day at the time set.

One or more zones may be selectively reprogrammed in a manner as described above or the entire system may be cleared and each zone completely reprogrammed. The entire system is cleared for new programming by simultaneously pressing and releasing the time set and zone change push buttons 64 and 67 respectively. The entire system will also need to be reprogrammed in the event of a power failure that lasts longer than the ability of the emergency battery to maintain the schedule within the programmed computer. In accordance with the embodiment of the invention described, power failure results in the emergency battery maintaining the schedule within the programmed computer for about ten hours. However, during the power off period no displays are illuminated.

As shown in FIG. 4 the programmable computer within the control station 52 includes a central processing unit 90, three program storage memories 91 and two random excess memories 92 for storage of data. Display outputs from the system pass through a peripheral interface adaptor 93 and inputs into the system pass through tristate buffers 101 and 102. The various operational units of the system are interconnected by means of an address bus 95 and a data bus 94 in a manner as shown.

In one embodiment of the present invention the central processing unit 90 included a Model MPS 6502 CPU by MOS Technology Inc. of 950 Rittenhouse Road, Norristown, Penna. 19401. The program memories 91 included Model 2708 EROMS by Motorola and the RAM data memories 92 included Model SY 2112N memories by Synertek of Santa Clara, Calif. The peripheral interface adapter 93 included a Model 6522 adapter by MOS Technology Inc.

Output B of the peripheral interface adaptor 93 is coupled to a digit driver 96 the output of which is coupled to all of the digit displays 60-63 and indicator lights 69 and 70-72. Output A of the peripheral interface adaptor 93 is coupled to segment drivers 98 by way of segment decoders 97 for providing the digit displays 60-63. The digit displays 60-63 are preferably multiplexed in accordance with well known programming techniques. The data for the various control panel 52 indicators 69, 70-72 is placed into a pair of latches 99 from the data bus 94 from whence they are decoded to drive the appropriate indicator 69, 70-72 by means of a driver 100. Each latch 99 contains a plurality of flip-flops (not shown). The zone control signals 86-88 are generated and placed onto the power lines 51 by means of a pair of latches 103, a crystal 104 controlled phase locked loop 150 and a voltage controlled phase locked loop 105 and a voltage controlled oscillator 106. Each latch 103 contains a plurality of flip-flops (not shown). The data representative of a zone to be controlled is entered into the latch circuits 103 and utilized to derive an analog voltage from the phase locked loop 104 which controls the frequency of the voltage controlled oscillator 106. Feedback to the phase locked loop 104 from the voltage controlled oscillator 106 is provided on a lead 107. The output from the voltage controlled oscillator 106 is amplified by an amplifier 108 before being applied to the three phase power lines 51. The digital data in the latch circuits 103 determines the analog output of the phase locked loop 104 which in turn determines the frequency of the voltage controlled oscillator 105 which in turn designates the zone which is to be controlled. the duration of the data in the latch circuits 103 as controlled by the programmed computer determines the function that is to be performed, i.e., whether the units 53 in the selected zone are to be turned on or to be turned off.

The seven day of the week, two position manually actuated switches 69 are coupled to the tristate buffer 101 as shown in FIG. 4. Also, coupled to the tristate buffer 101 is a shut down switch 116 which is actuated by the abnormal condition sensor 81 illustrated in FIG. 1. The remaining switches 64-67 and 73-75 on the control panel 52 are coupled to the other tristate buffer 102. Also coupled to this buffer 102 are the various analog inputs to the system which are converted to a digital signal by way of a well known dual slope analog to digital converter 109. The various analog inputs to the system are multiplexed into the input of the analog to digital converter 109 by a sequencer 110. In accordance with one embodiment of the present invention which was constructed, the sequencer included a Model MC14051 one of eight decoder by Motorola. As shown in FIG. 4 one input to the multiplexer 110 includes an analog voltage from a screwdriver adjustable 76 potentiometer 115 which indicates the amount of advanced turn on time or anticipation, that is to be utilized for the zones having advanced turn on time. Also coupled to the multiplexer 110 is the analog voltage output from the outside temperature sensor 78 which preferably includes a thermistor 90. Also coupled as an input to the multiplexer 110 is a voltage obtained at the junction of two resistors 111 and 112 which simulates a reference temperature, i.e., the 60° F. reference temperature utilized by the system in determining how much advanced turn on time, or anticipation, is needed for a given outside temperature. Also coupled as an input to the multiplexer 110 on lead 80 is the battery voltage which enables the system to periodically check the condition of the emergency battery 77 and turn on the battery trouble light 71 if the emergency battery is not in proper condition. Address decoders 113 and 114 provide a number of enabling signals E which enable the system to provide outputs and to accept inputs in a determined manner.

The operation of the programmable computer system illustrated in FIG. 4 will be further understood by reference to the manual entitled "MPS 6500 Microcomputer Family Hardware Manual" by MOS Technology Inc. of 950 Rittenhouse Road, Norristown, Penna. 19401 dated Jan. 19, 1976, the contents of which are incorporated herein by reference. Additionally, the system illustrated in FIG. 4 will be further understood by way of the flow charts illustrated in FIGS. 6 through 16 which are discussed hereinbelow and which can be further understood by reference to the manual entitled "MPS 6500 Microcomputer Family Programming Manual" by MOS Technology, Inc. of 950 Rittenhouse Road, Norristown, Penna. 19401 dated Jan. 19, 1976, the contents of which are incorporated herein by reference.

Figure 5:
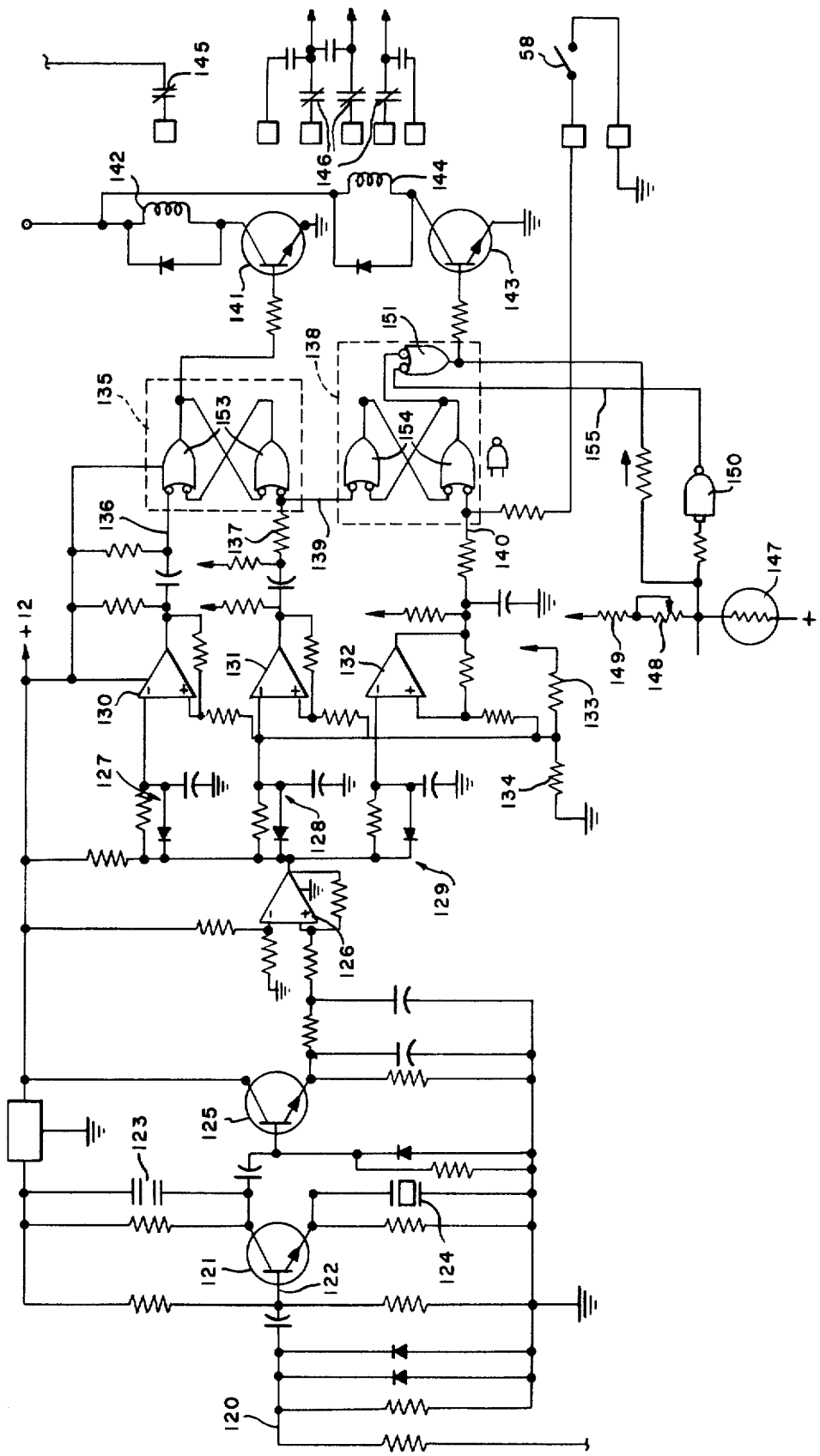
FIG. 5 is a schematic illustration of a receiver which actuates power consumming appliances in accordance with the present invention.

A schematic diagram of a suitable receiver 56 to be coupled between the power lines 51 and each unit 53 is illustrated in FIG. 5. The control signals appearing on the power lines 51 are applied to the base of a transistor 121 by way of a lead 120. The transistor 121 has a crystal 124 and 123 connected in series with its emitter and collector, respectively, such that the transistor 121 responds only to control signals having the proper frequency. Accordingly, by properly selecting the crystals 123 and 124 the receivers 56 will only respond to the control signals associated with the zone in which the associated units 53 are placed. The control signals which are passed by the transistor 123 are amplified and rectified by a Class B amplifier which includes a transistor 125. The rectified signals are amplified by another amplifier 126 before being applied to three RC time constant circuits 127, 128, and 129. The first time constant circuit 127 is coupled to one input of a first differential amplifier 130, the second time constant circuit 128 is coupled to one input of a second differential amplifier 131 and the third time constant circuit 129 is coupled to one input of a third differential amplifier circuit 132. Each differential amplifier circuit 130, 131 and 132 has one input connected to a source of reference potential located at the junction of two resistors 133 and 134. The resistor and capacitor components of the three time constant units 127, 128, and 129 are so chosen that the occurrence of a shut down signal (86 FIG. 3) will cause the potential applied to the first differential amplifier 130 by the first time constant circuit 127 to be greater than the reference potential thereby causing the first differential amplifier 130 to conduct whereas the second and third time constant circuits 128 and 129 are such that the occurrence of a shut down signal 86 does not provide a voltage level at the input of the second and third differential amplifier circuits 131 and 132 that is greater than the reference voltage thereby not enabling these amplifiers 128 and 129 to conduct in the presence of a shut down signal. The three time constant circuits 127, 218 and 129 are so chosen that the occurrence of a turn off signal 87 will cause conduction of the first differential amplifier 130 followed by conduction of the second differential amplifier 131 whereas the three time constants 127, 218 and 129 are so chosen that the occurrence of the turn on signal 88 will cause the first differential amplifier 130 to conduct followed by conduction of the second differential amplifier 130 which in turn is subsequently followed by conduction of the third differential amplifier 131. The output of the first differential amplifier 130 is coupled to one input of a first flip-flop 135 which includes two cross coupled NAND gates 153. The output of the second differential amplifier 131 is coupled to another input of the first flip-flop 135 and to one input of a second flip-flop 138 which includes two cross coupled NAND gates 154. The output of the third differential amplifier 132 is coupled to the other input of the second flip-flop 138. The output of the first flip-flop 135 is coupled to a transistor 141 to control the operation of a relay K 1 whereas the output of the second flip-flop 138 is coupled to a transistor 143 to control the operation of a relay K 2. When transistor 141 conducts the relay K 1 will open normally closed contacts 145 to interrupt AC power to the associated unit 53. Alternatively, opening contacts 145 may interrupt the control voltage between the associated unit 53 and its thermostat 54 to turn the associated unit 53 off. In accordance with one embodiment of the invention which was constructed, conduction of the transistor 143 actuated the relay K 2 to open normally closed contacts 146 which substituted a new low temperature thermostat (not shown) for the thermostat 54 that controls the associated unit 53 when the unit 53 has been turned on. However, as will be apparent to those skilled in the art, actuation of the relay K 2 can also be utilized to interrupt AC power to the associated unit 53 or to interrupt the low voltage to the thermostat 54 which is utilized to control the associated 53.

The operation of the receiver in FIG. 5 is such that when a control signal of the proper frequency occurs on the input 120 to transistor 121, it is rectified and then amplified before being applied to each of the three time constant circuits 127, 128 and 129. A shut down signal 86 will cause conduction of the first differential amplifier 130 to set the first flip-flop 135 which in turn causes conduction of the transistor 141 and actuation of the K 1 relay to lock out the associated unit 53. The occurrence of a turn off signal 87 of the proper frequency will be passed by transistor 121, rectified and amplified before being applied to each of the three time constants 127, 128 and 129. The occurrence of a turn off signal 87 will cause conduction of the differential amplifier 130 to set the first first flip-flop 135 to actuate the relay K 1 to turn off the power to the associated unit 53. Subsequently, the second differential amplifier 131 will conduct to reset the first flip-flop 135 and set the second flip-flop 138 to turn off the transistor 141 to deactivate the relay K 1 after which the transistor 143 conducts to actuate the relay K 2 to again disable the associated unit 53. The occurrence of a turn on signal 88 will be passed, if of the proper frequency, by transistor 121 then rectified and amplified by transistor 125 and amplifier 126. The time duration of the turn on signal 88 will cause the first differential amplifier 130 to conduct to set the first flip-flop 135 thereby actuating the relay K 1 to disable the associated unit 53 followed by conduction of the second differential amplifier 131 which resets the first flip-flop 135 and sets the second flip-flop 138 to disable the relay K 1 but enabling conduction of transistor 143 to enable actuation of relay K 2 to disable the associated unit 53. However, subsequently, the third differential amplifier 132 conducts to reset the second flip-flop 138 which renders the transistor 143 non-conducting to disable relay K 2 thereby enabling operating power to be applied to the associated unit 53. Coupled to one input of the second flip-flop 138 is the manual switch 58 which, when depressed, resets the second flip-flop 138 to enable the associated unit to be turned on. However, as described above, once a unit 53 is turned off by the control station 52, the control station 52 will periodically, at set intervals, send out turn off signals 87 until the unit 53 is again turned on the following day.

The temperature sensor 57 at the receive 56 is illustrated in FIG. 5 as including a thermistor 147 that is connected in series with a potentiometer 148 and a resister 149. The voltage appearing at the junction of the thermistor 147 and the potentiometer 148 is inverted by an inverter 150 and applied as one input to a NOR gate 151 in the second flip-flop 138. The output of the NOR gate 151 controls conduction or nonconduction of the transistor 143 and is also coupled to the junction of the thermistor 147 and the potentiometer 148 by way of a lead 155. When the unit 53 associated with the receiver 56 has been turned off due to a turn off signal 87 and the temperature at the vacinity of the receiver 56 falls to a predetermined minimum (for example 55° F.) the voltage appearing at the junction of the thermistor 147 and the potentiometer 148 is inverted and passed through the NOR gate 151 and is of sufficient magnitude to turn off transistor 143 thereby inactivating relay K 2 and turning on the associated unit 53 to provide heat. The associated unit 53 will remain on producing heat until the voltage at the junction of the thermistor 147 and potentiometer 148 falls to a level that causes the transistor 143 to again become conducting thereby actuating relay K 2 to open the normally closed contacts 146. Due to the current drained away from the junction between the thermistor 147 and the potentiometer 148 by way of the lead 155, the temperature must rise above the reference temperature (55° F.) before the transistor 143 is again rendered conducting. In accordance with the embodiment of the invention which is described herein, this temperature was chosen to be about 58° F. to give a hysteresis of about 3° F. between turning on and turning off of the associated unit 53 to provide heat to prevent a freeze during cold weather months. The minimum reference temperature (55° F.) is set by adjusting the potentiometer 148.

Figure 6A:
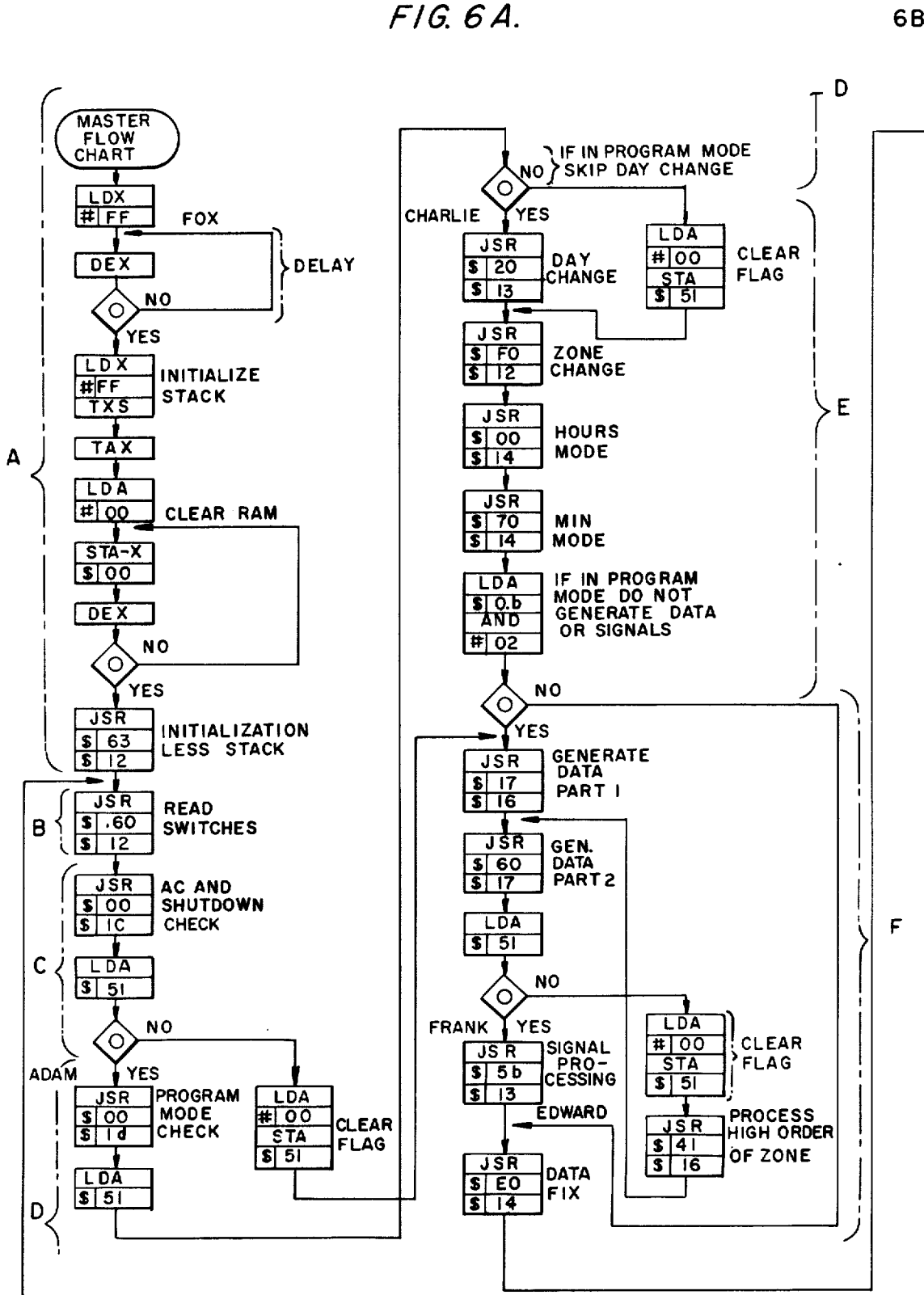
FIGS. 6A and 6B are a main body flow chart for the programmable computer which is utilized in the system shown in FIGS. 1 and 4.
Figure 6B:
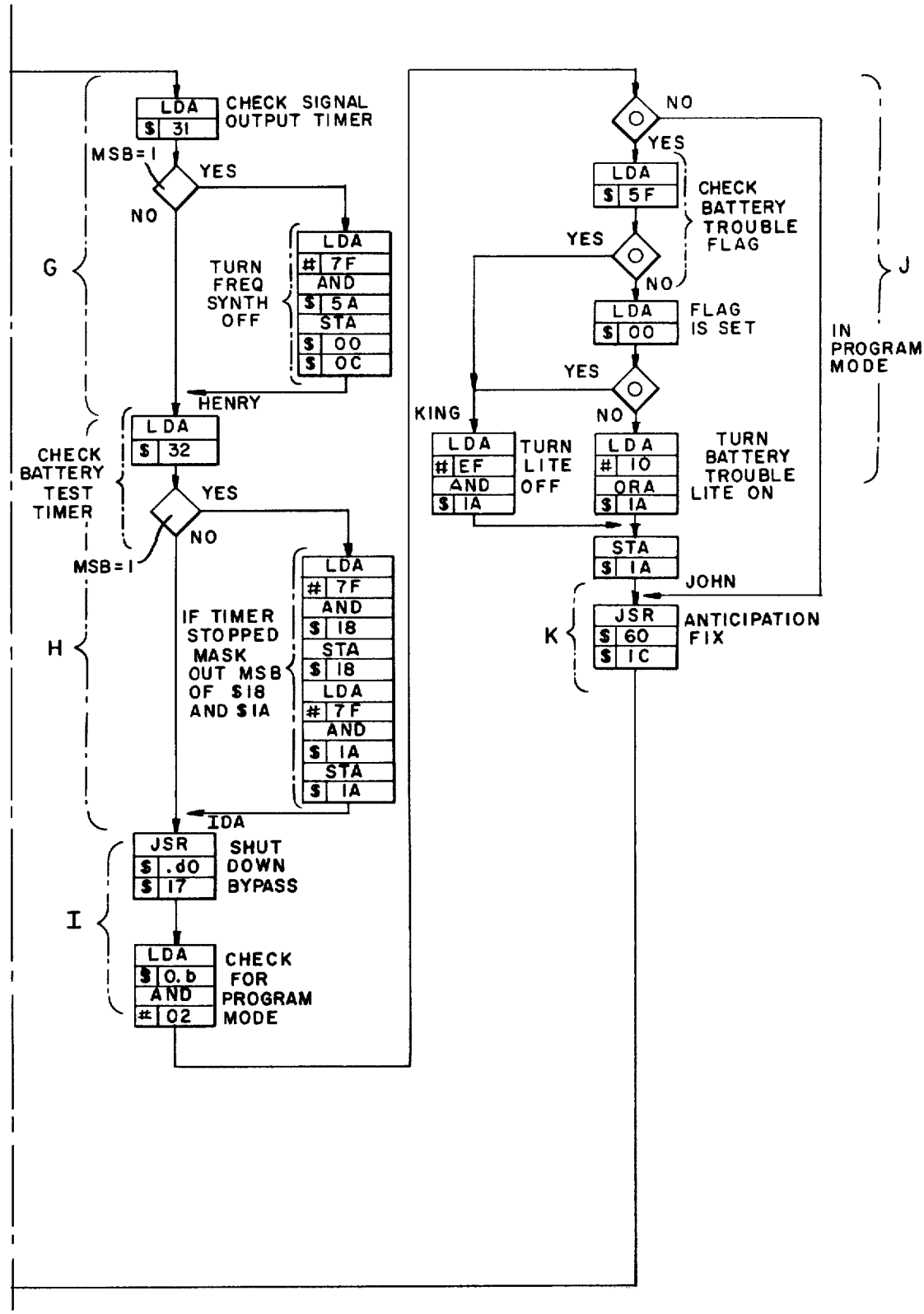
Figure 7A:
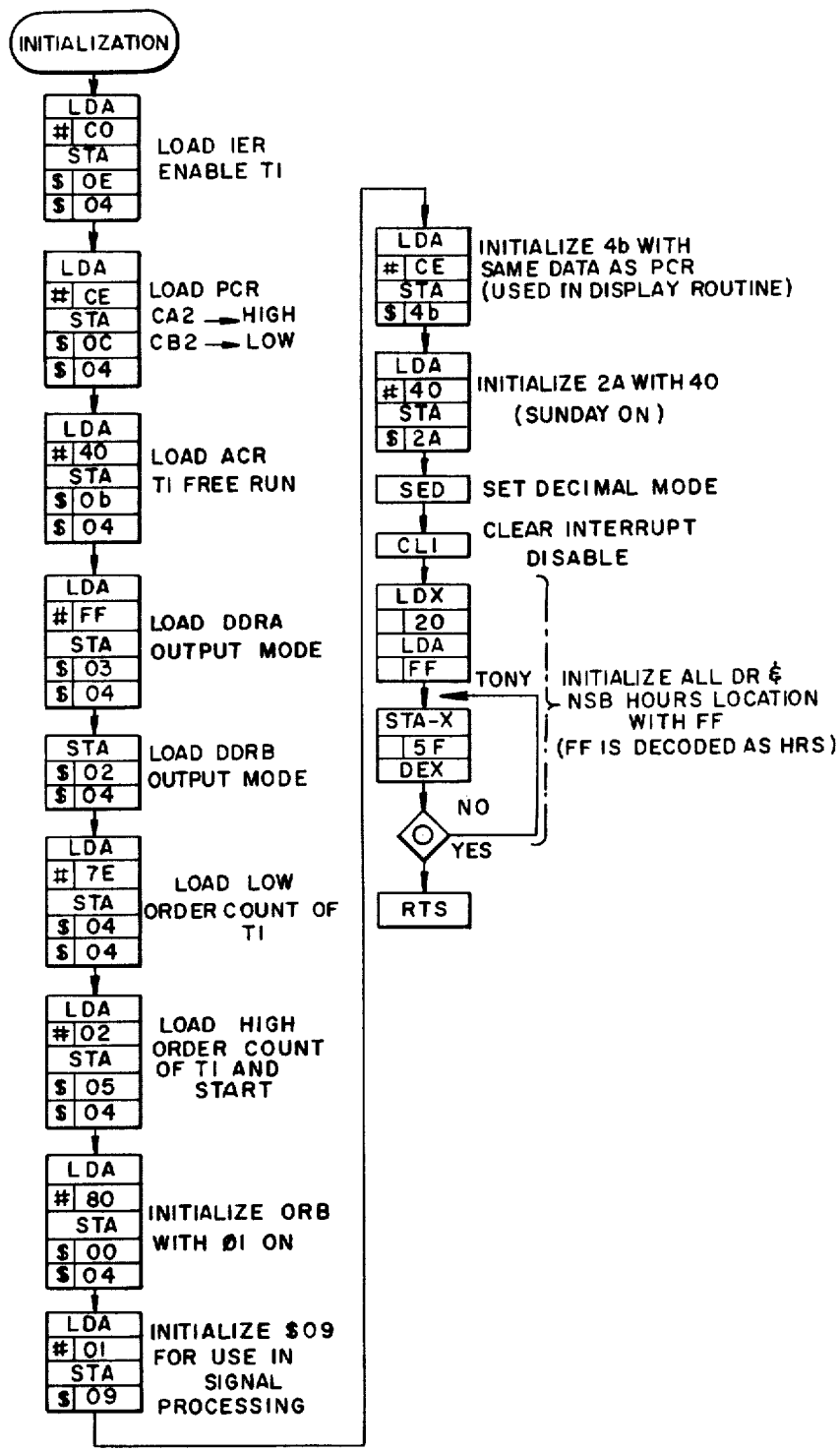
Figure 7B:
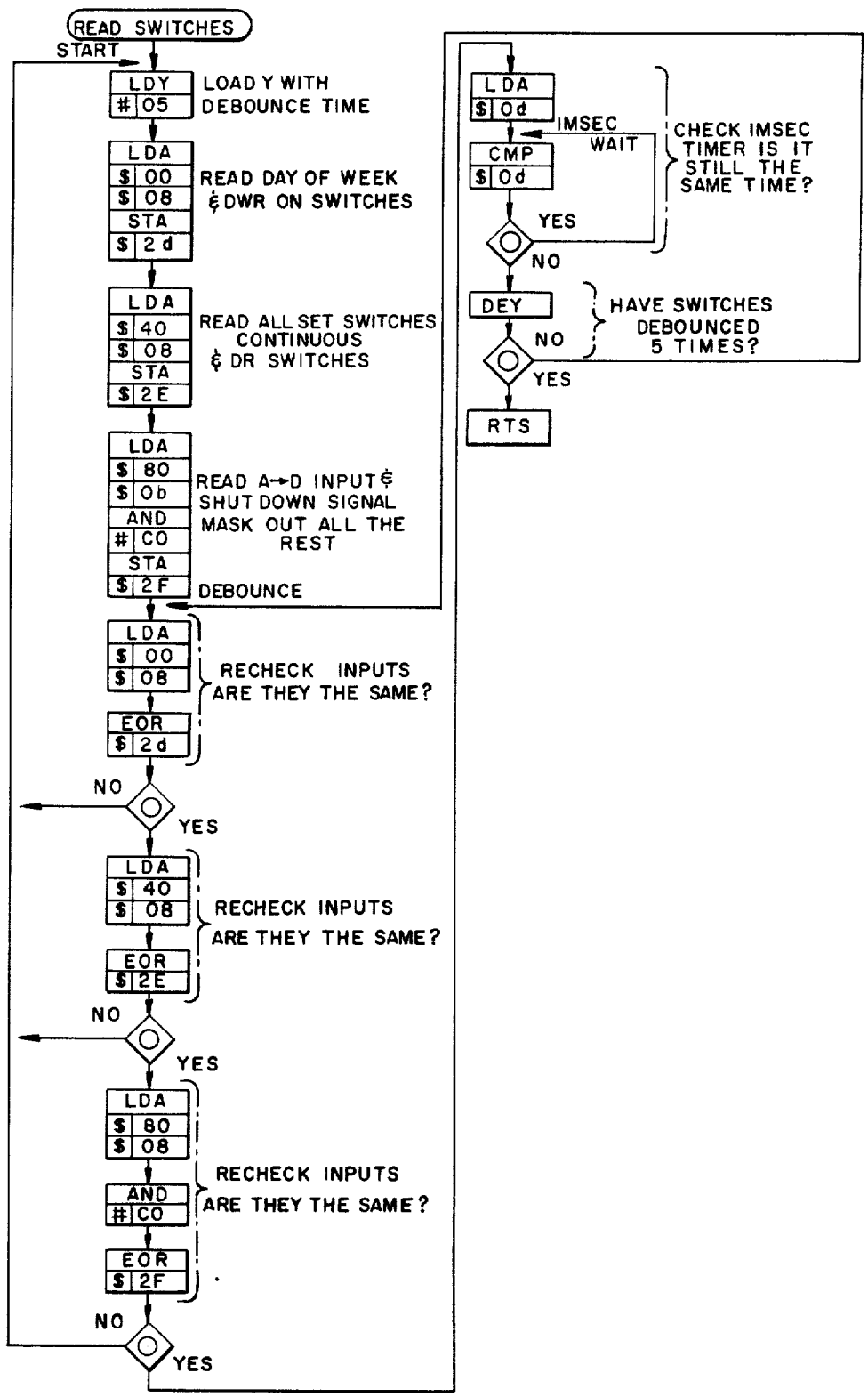
Figure 9B:
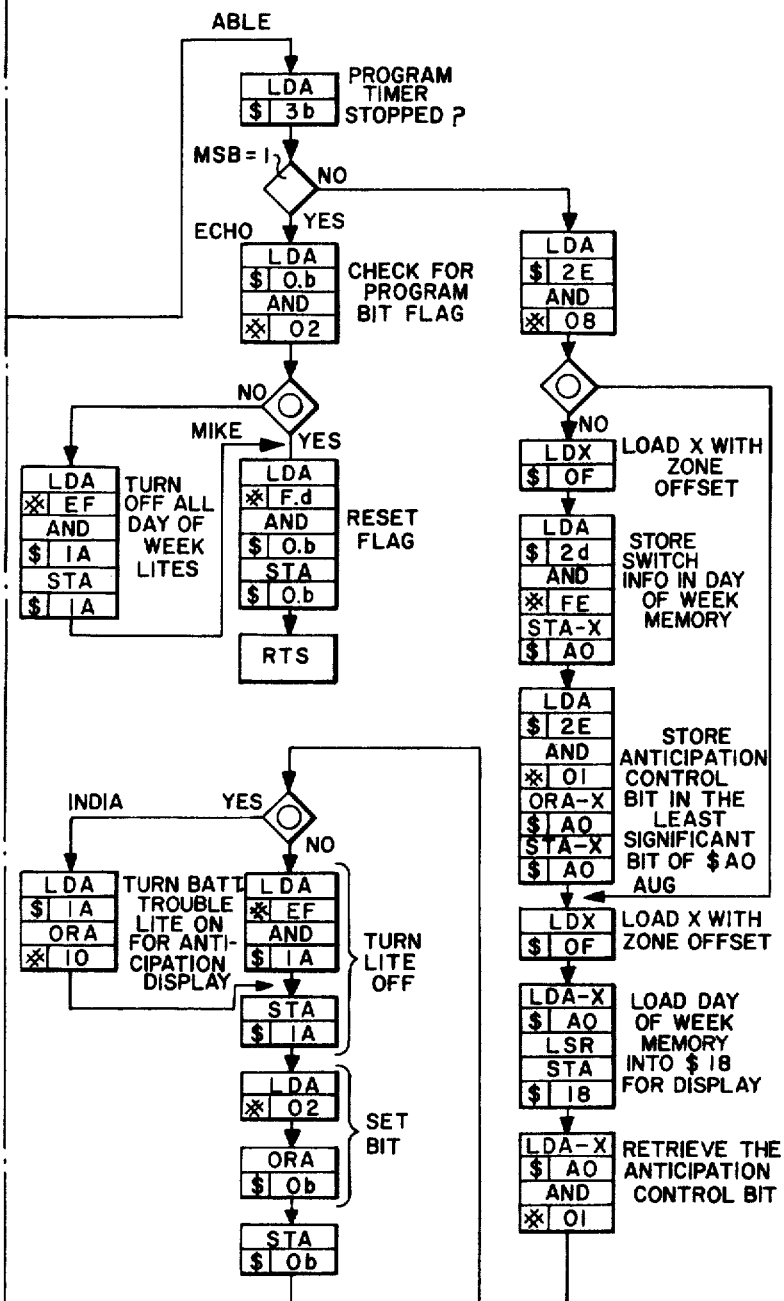
Figure 13:
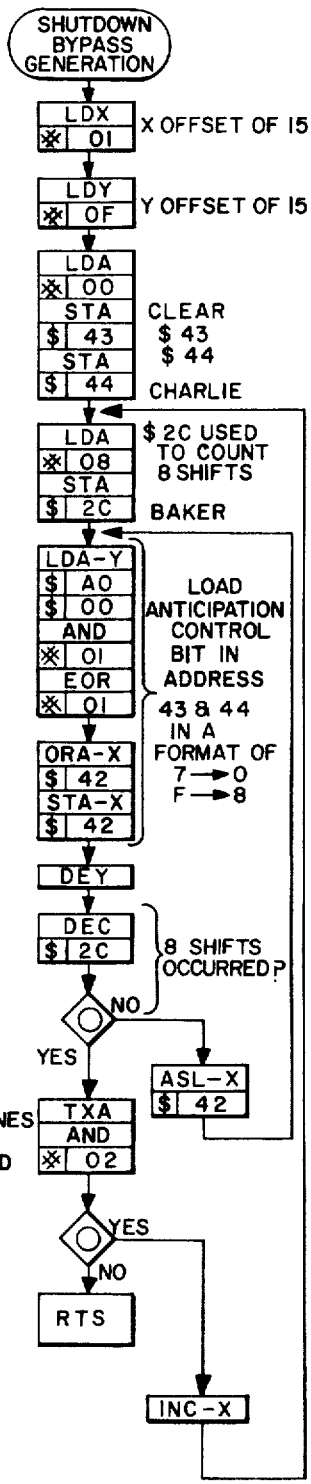
Figure 10A:
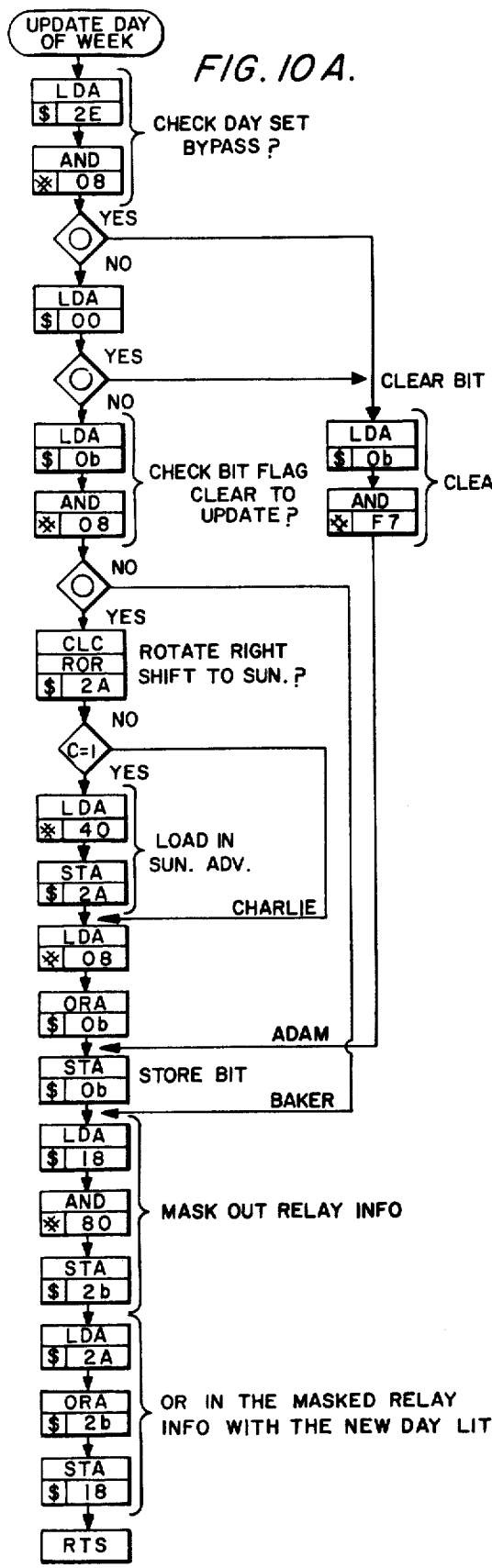
Figure 10B:
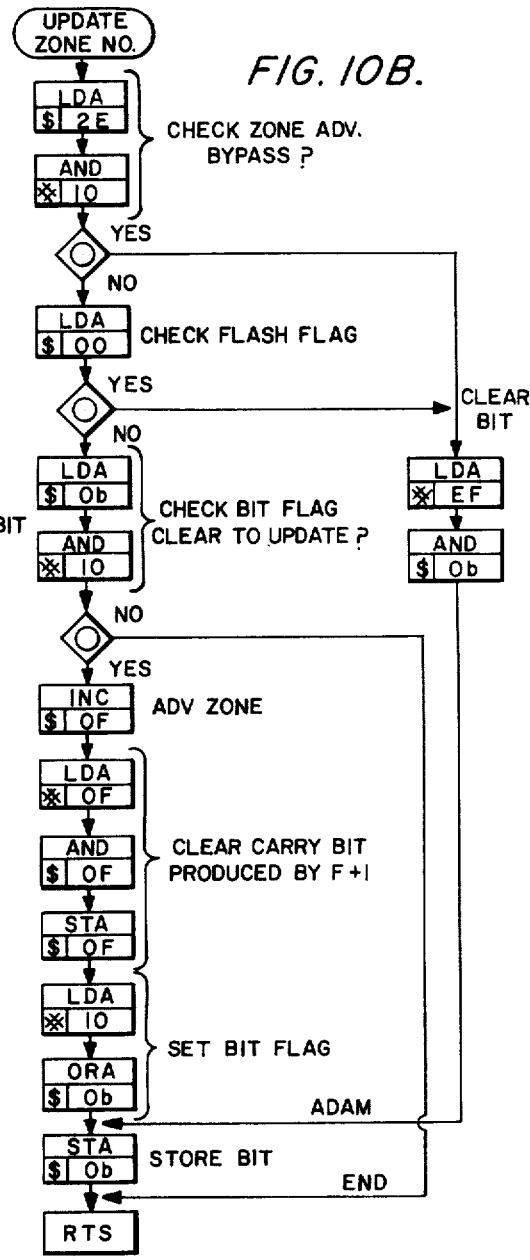
Figure 10C:
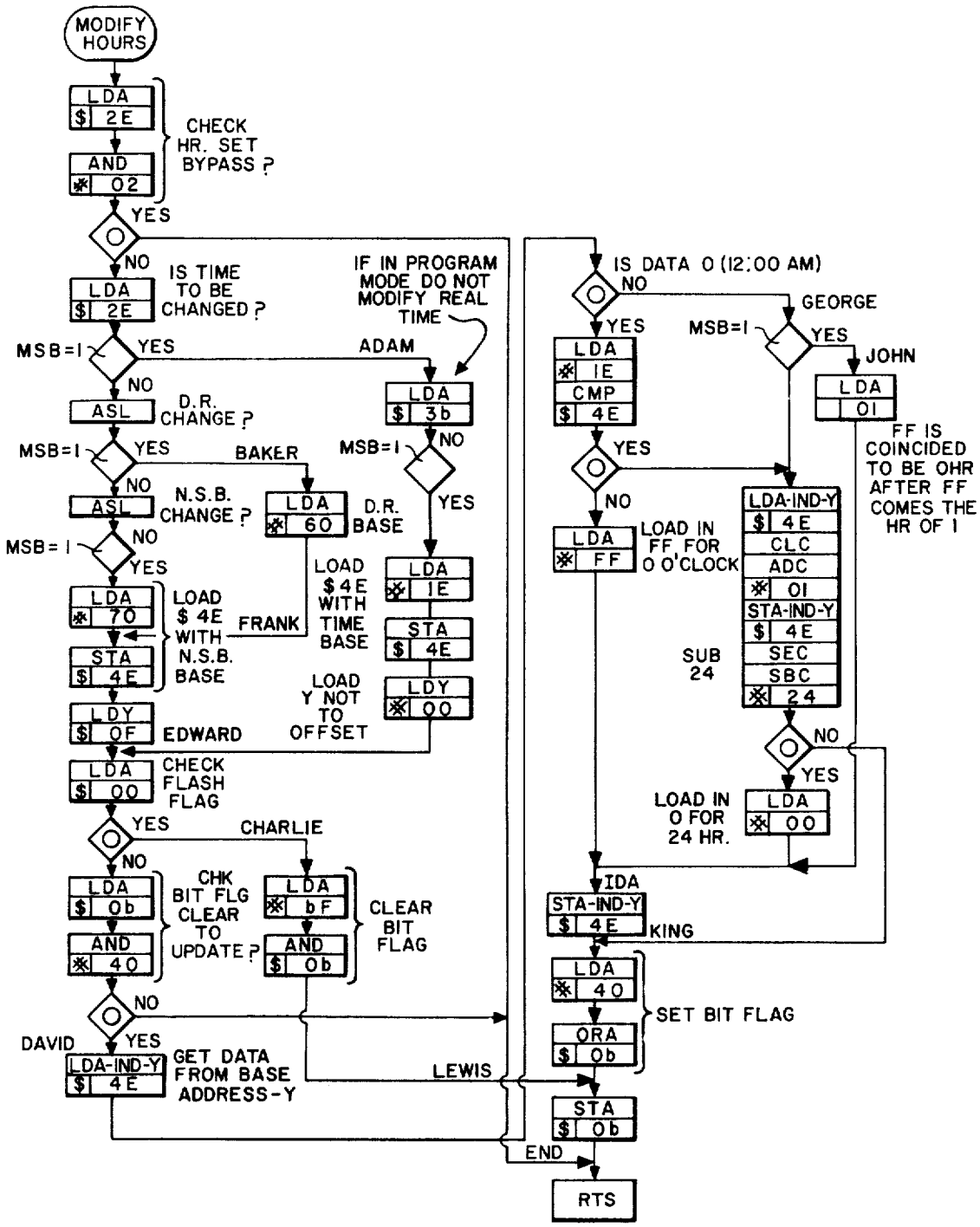
Figure 10D:
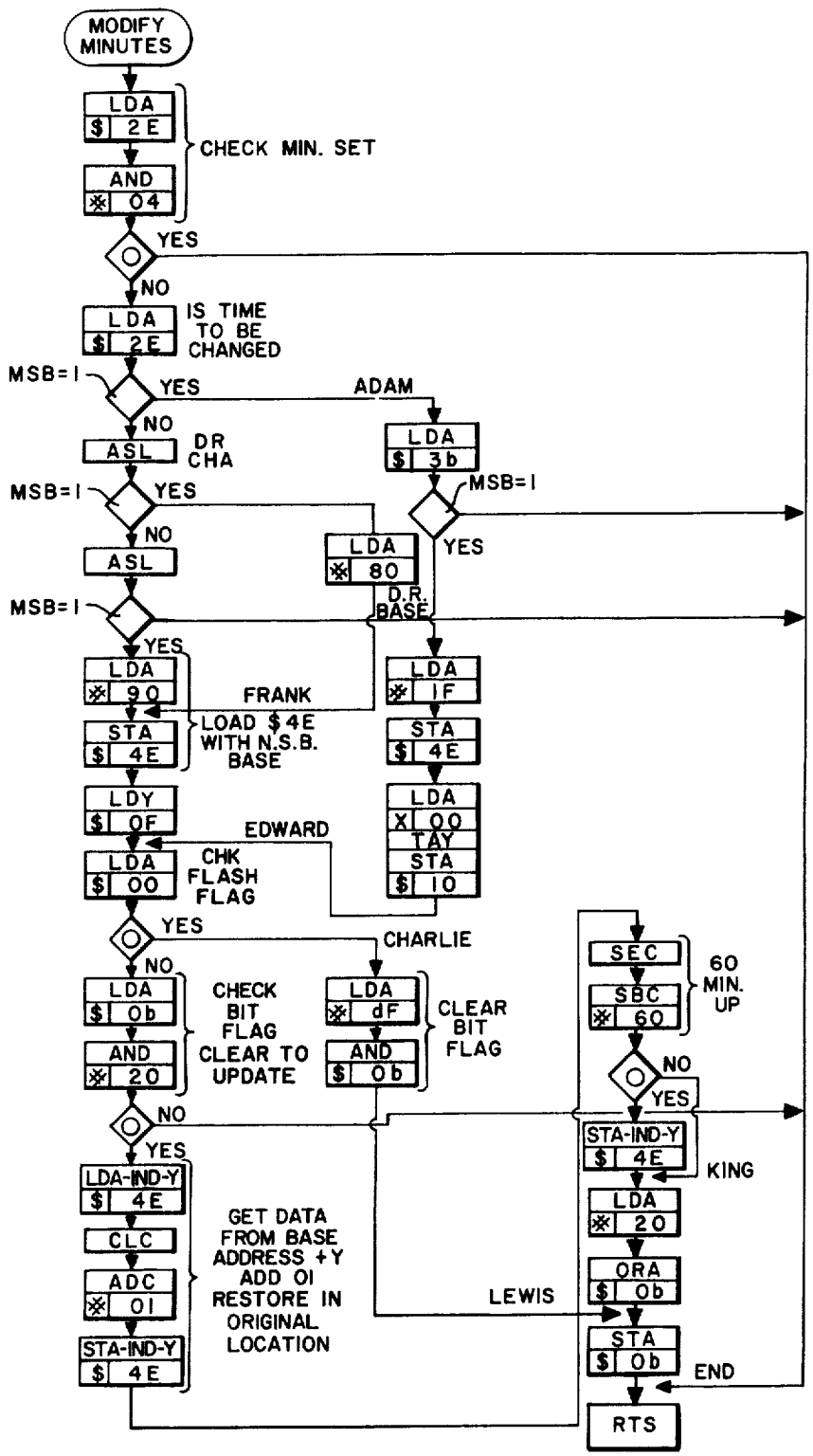
Figure 11A:
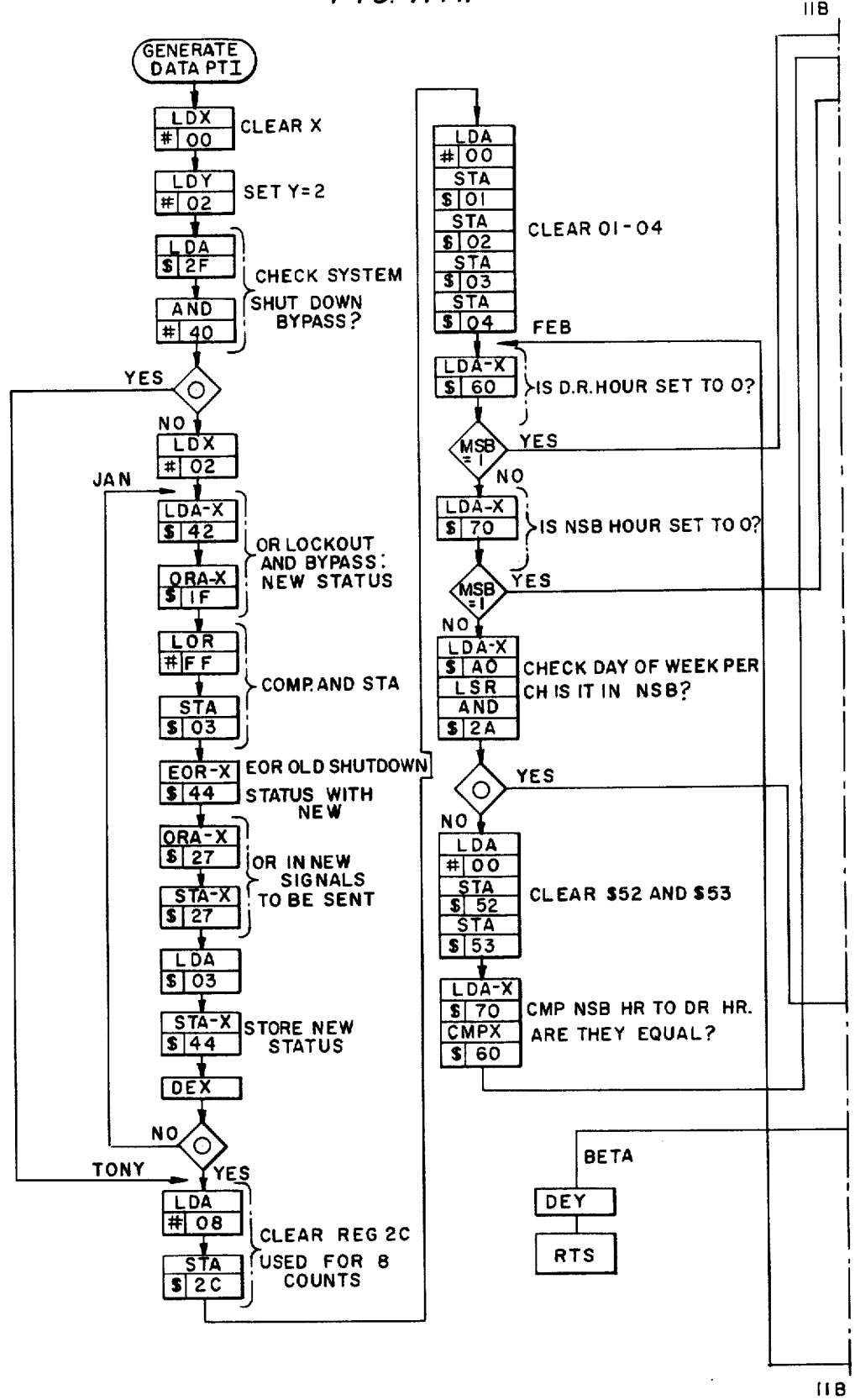
Figure 11B:
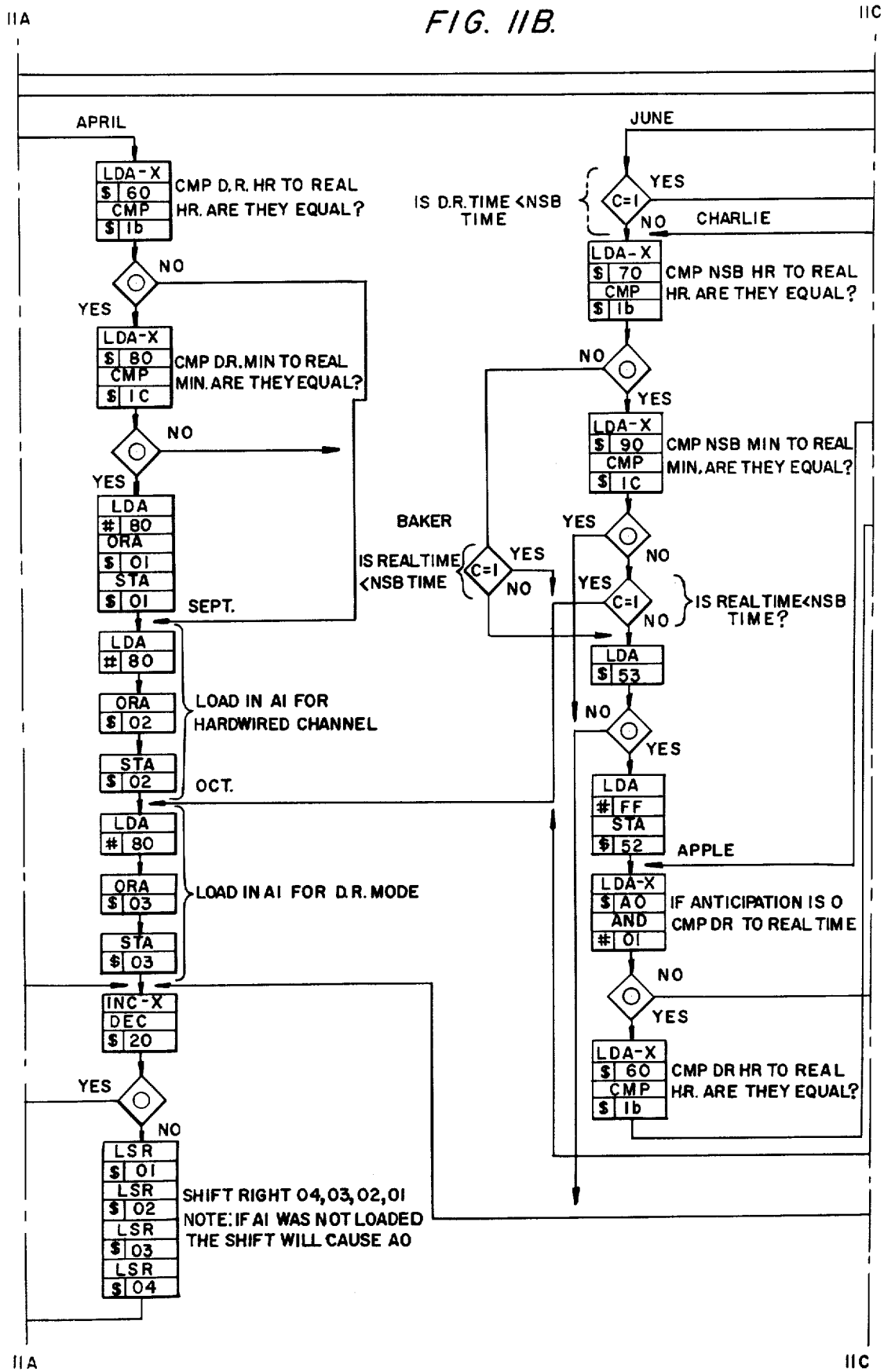
Figure 11C:
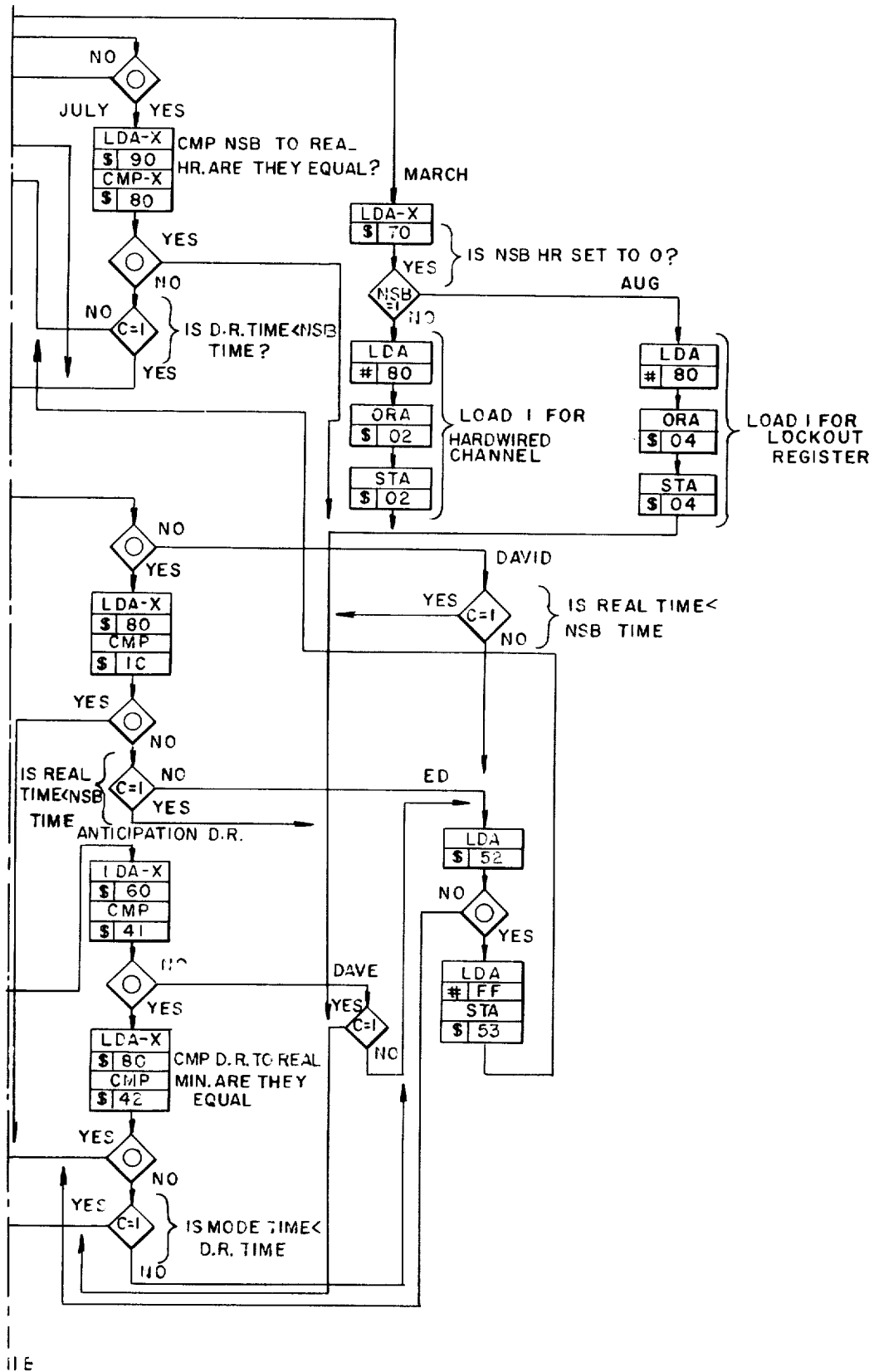
Figure 11D:
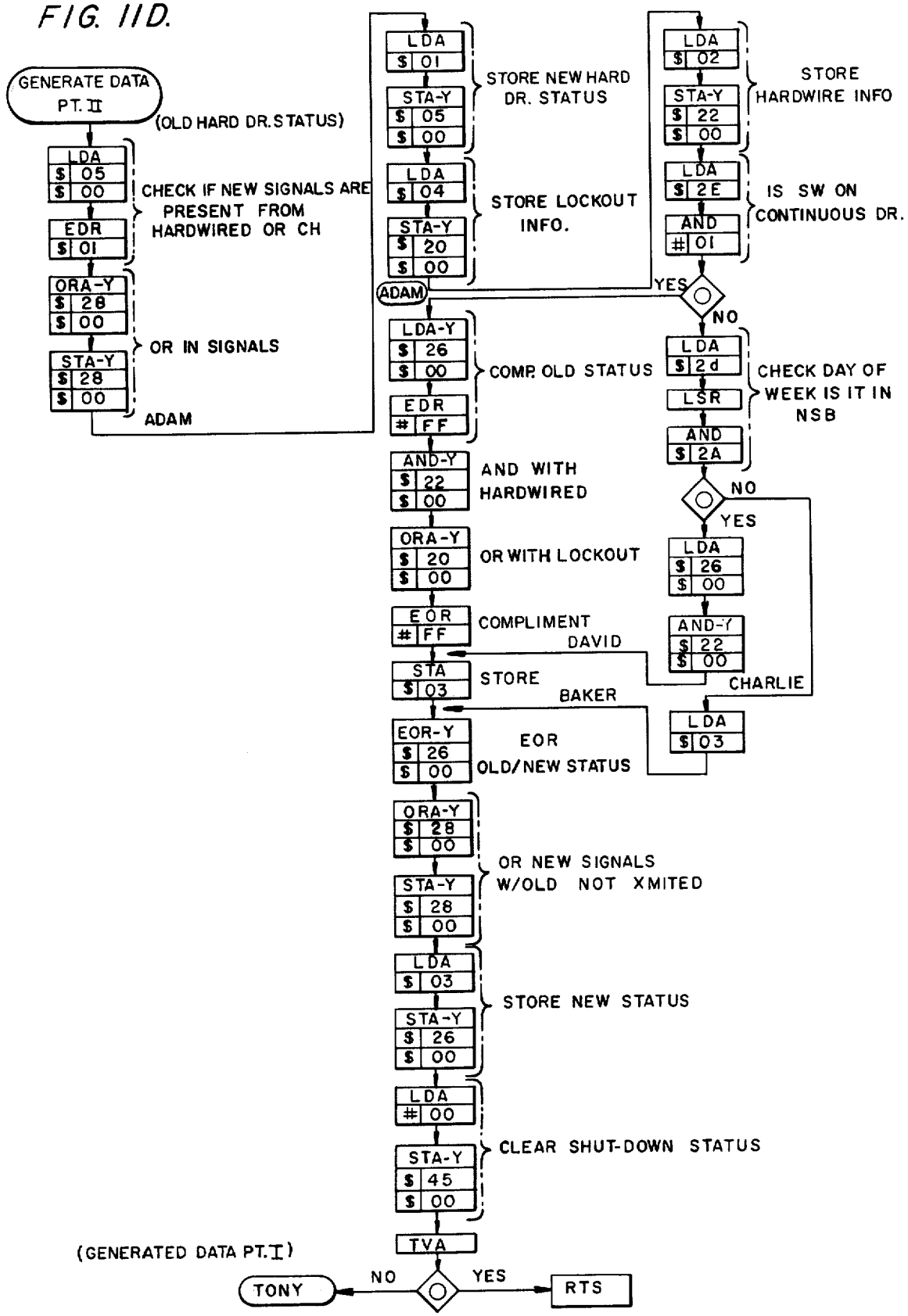
Figure 11E:
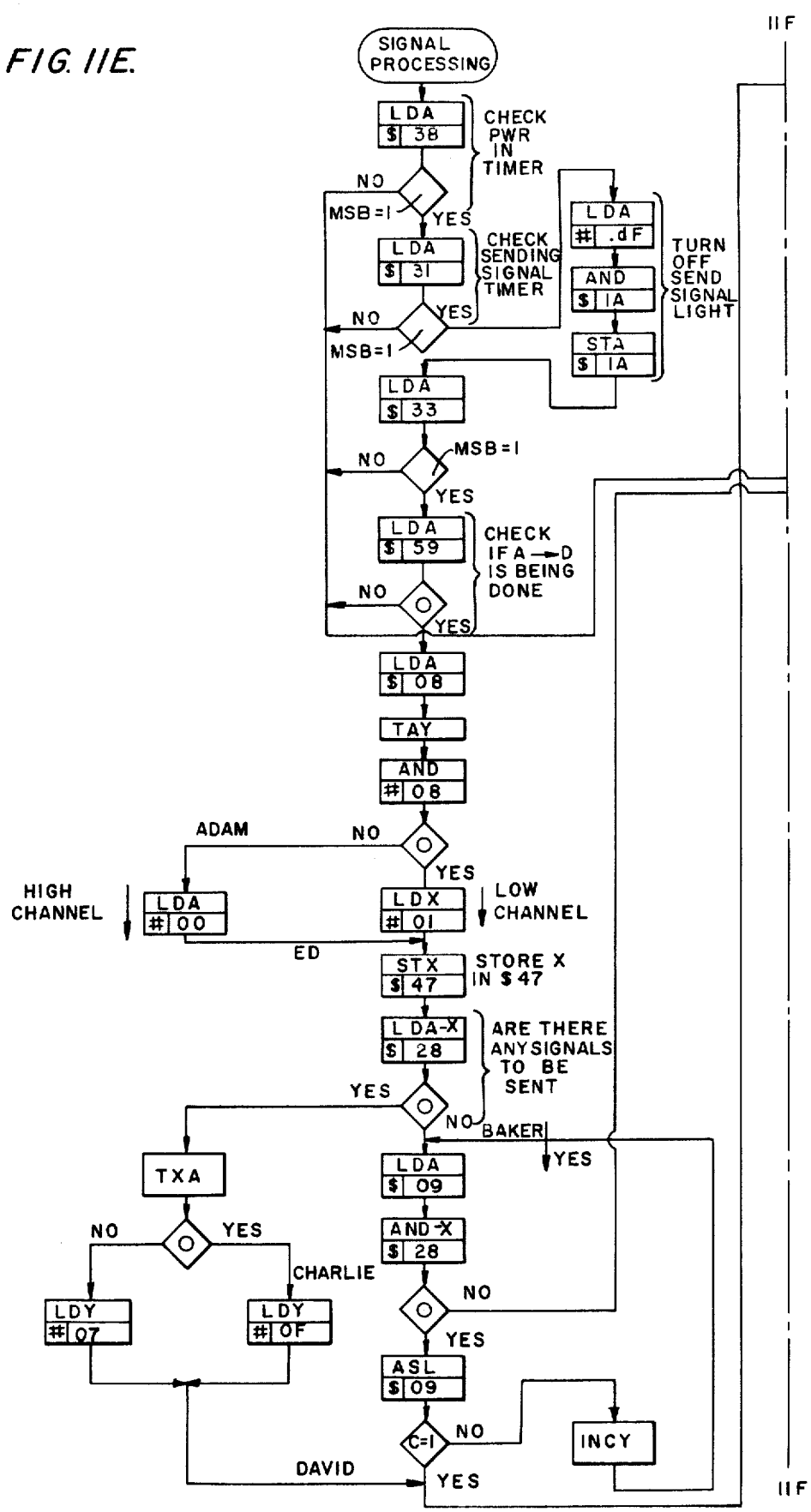
Figure 11F:
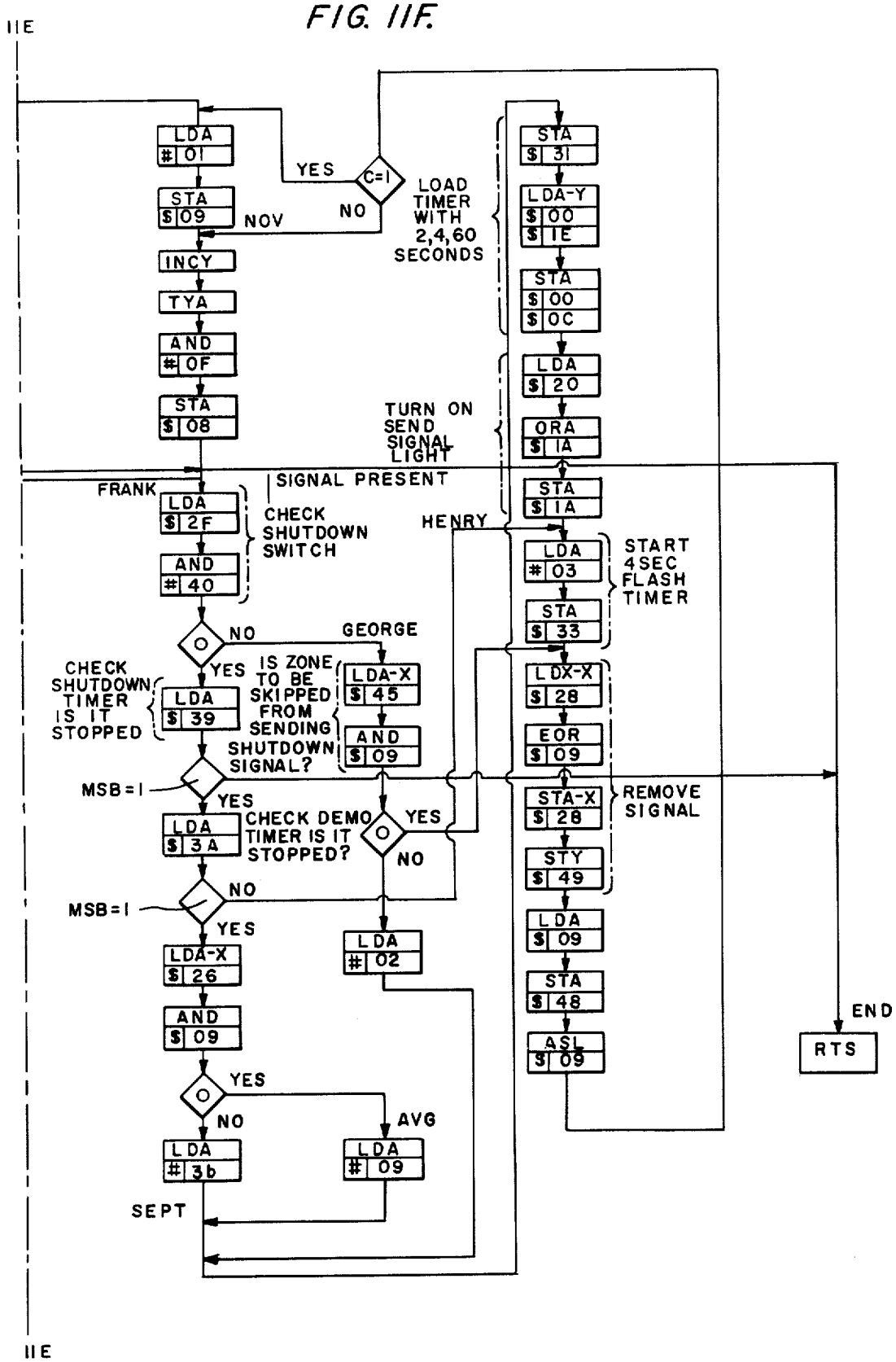
Figure 14:
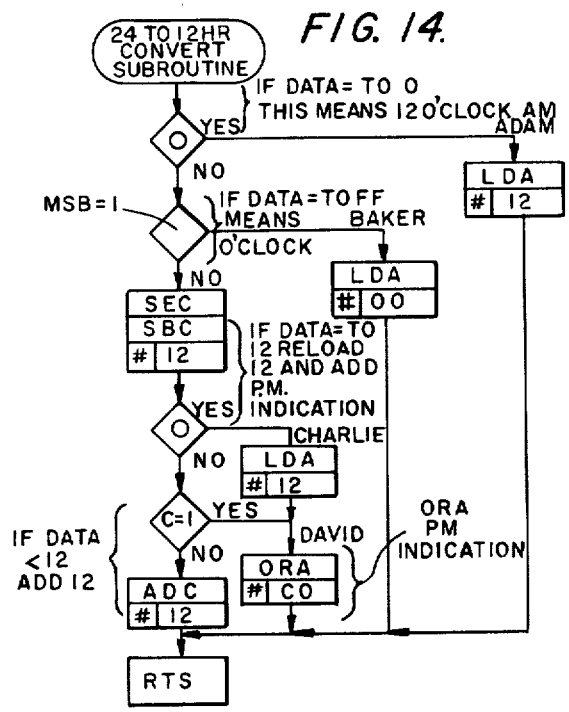
FIG. 14 is a flow chart which illustrates how the twenty four hour clock contained within the programmed computer is converted into a twelve hour clock signal having AM/PM indicators.
Figure 11G:
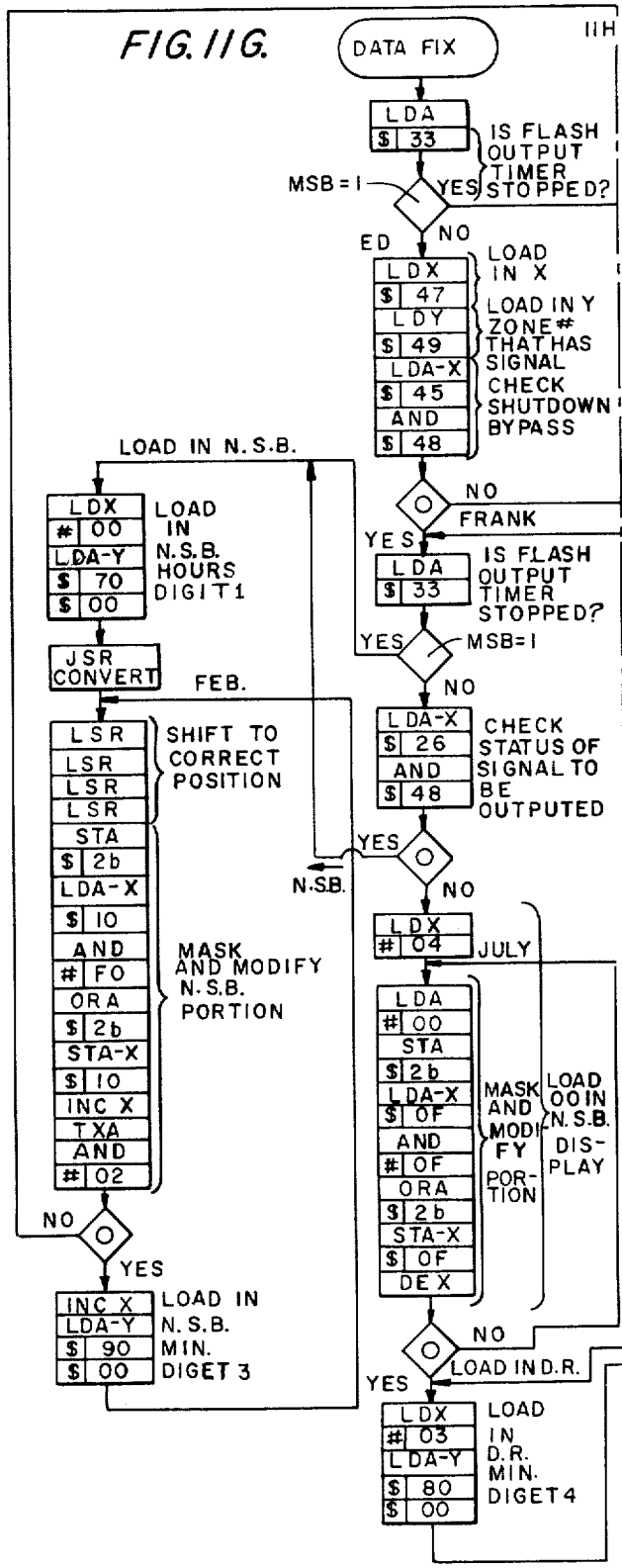
Figure 11H:
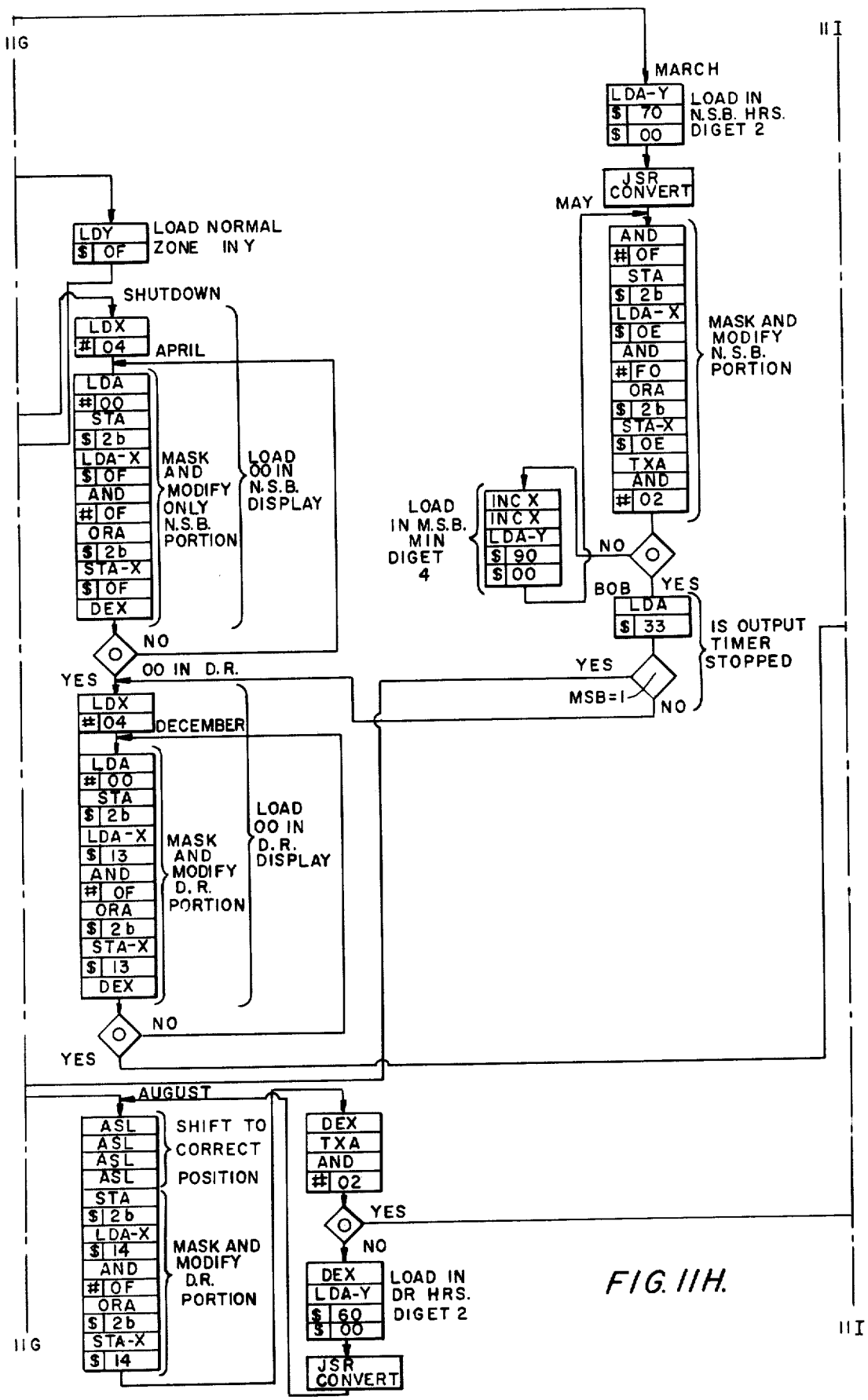
Figure 11:
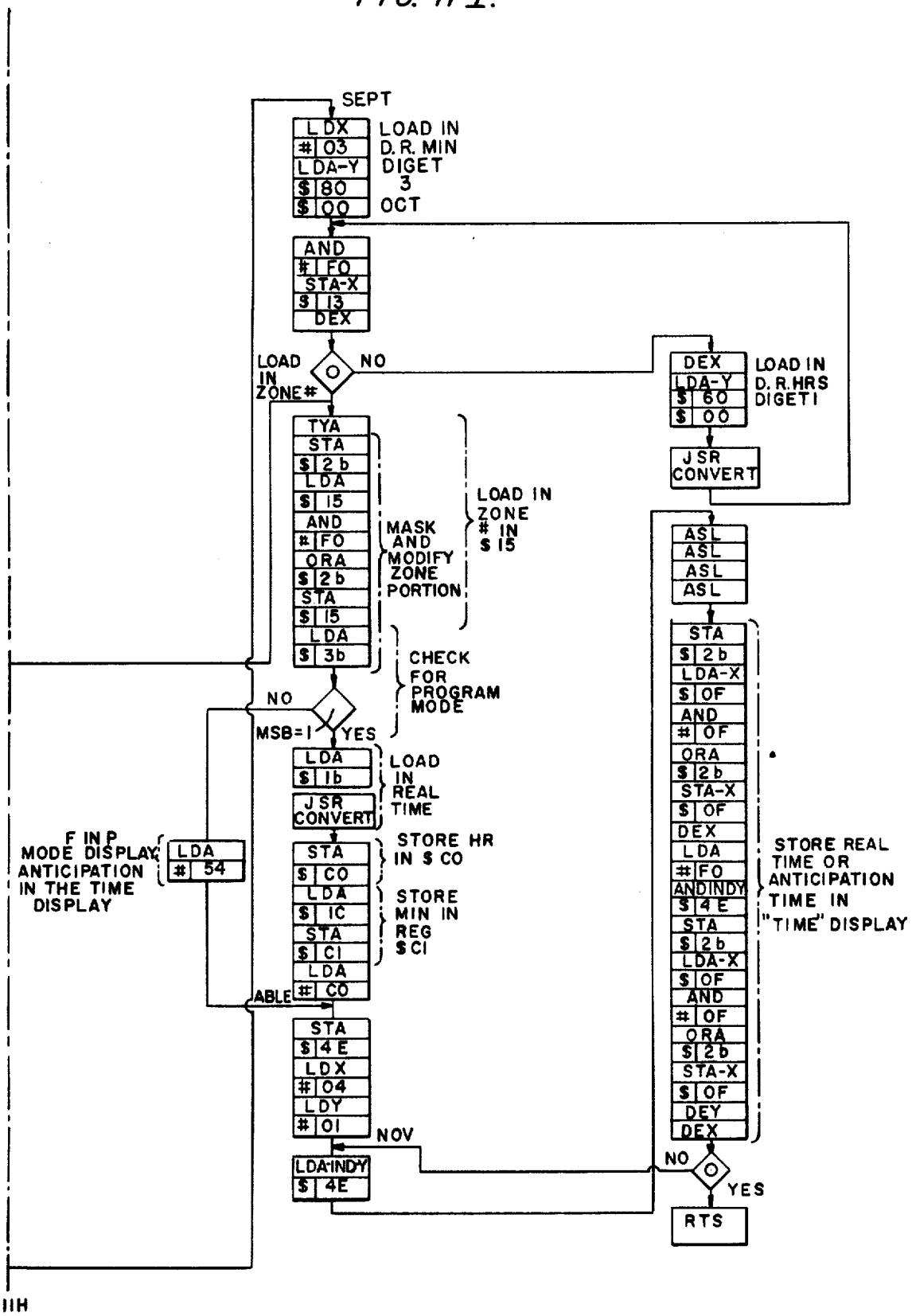
Figure 12A:
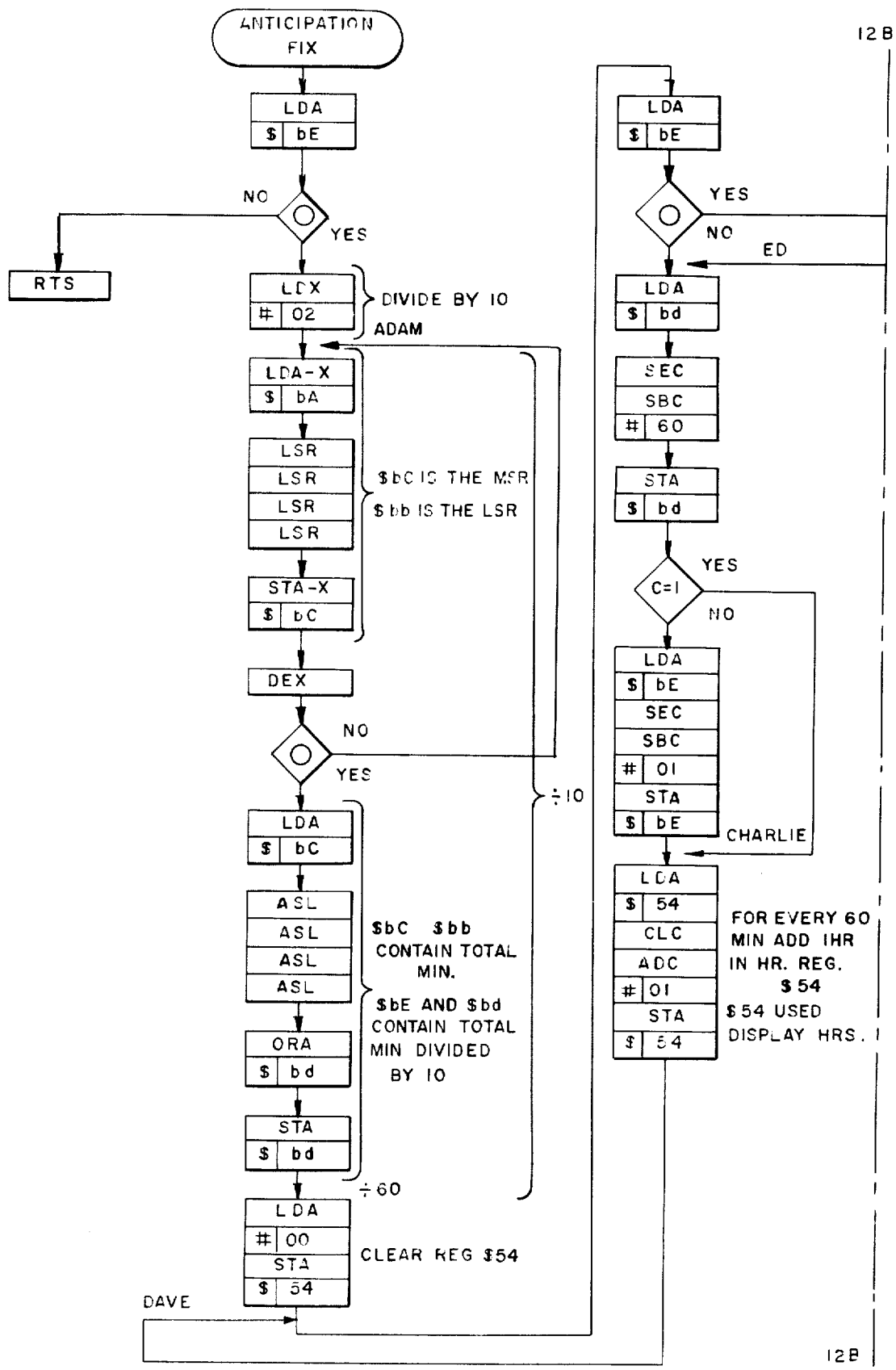
Figure 12B:
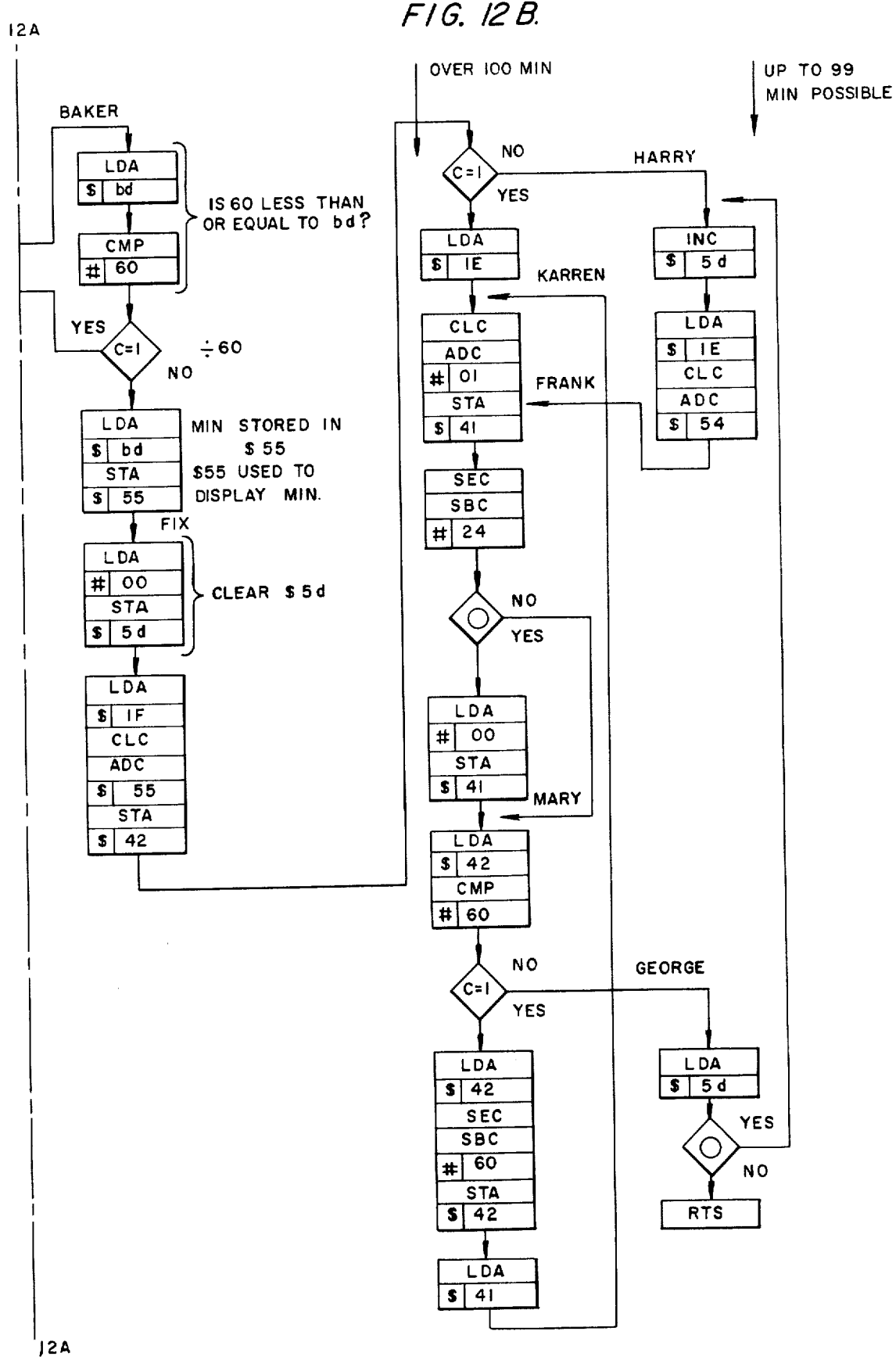

Shown in FIGS. 6A & 6B is a main body flow chart for the programmable computer system illustrated in FIG. 4. In FIG. 6A the A portion of the program initializes the system and clears all appropriate registers and memory locations. Section B of the program checks all the switches to see if any tasks need to be performed and will perform the tasks as required. Section C of the program checks for AC power to the control station 52 and checks to see if a shut down signal 86 is present due to the occurrence of an abnormal condition as indicated by the sensor 81. If a AC power signal is not present the system will revert to the emergency battery 77. Additionally, if a shut down signal 86 is present, the system will generate the data necessary for shutting down those zones having anticipation. Section D of the program checks to see if the system is in the program mode. If so, the day change sub-routine is bypassed and the new programming data is entered into the system. Section E of the program enables changes of zone, hours, minutes and days to be entered into the system. Section F of the program enables the program stored in the programmed computer system to be carried out by generating the necessary data and by performing the necessary signal processing. Section G of the program (as shown in FIG. 6B) insures that false and extraneous control signals are not applied to the power lines 51 when they are not needed. Section H of the program relates to the automatic check of the emergency battery. Section I of the program enables a zone to be bypassed if a shut down signal 86 occurs and the zone does not have anticipation. Section J of the program controls the various indicators 68 and 70-72 and turns them on or off as appropriate. Section K of the program compares the outside temperature with the reference temperature and varies the advance start up time according to the temperature difference.

Figure 15A:
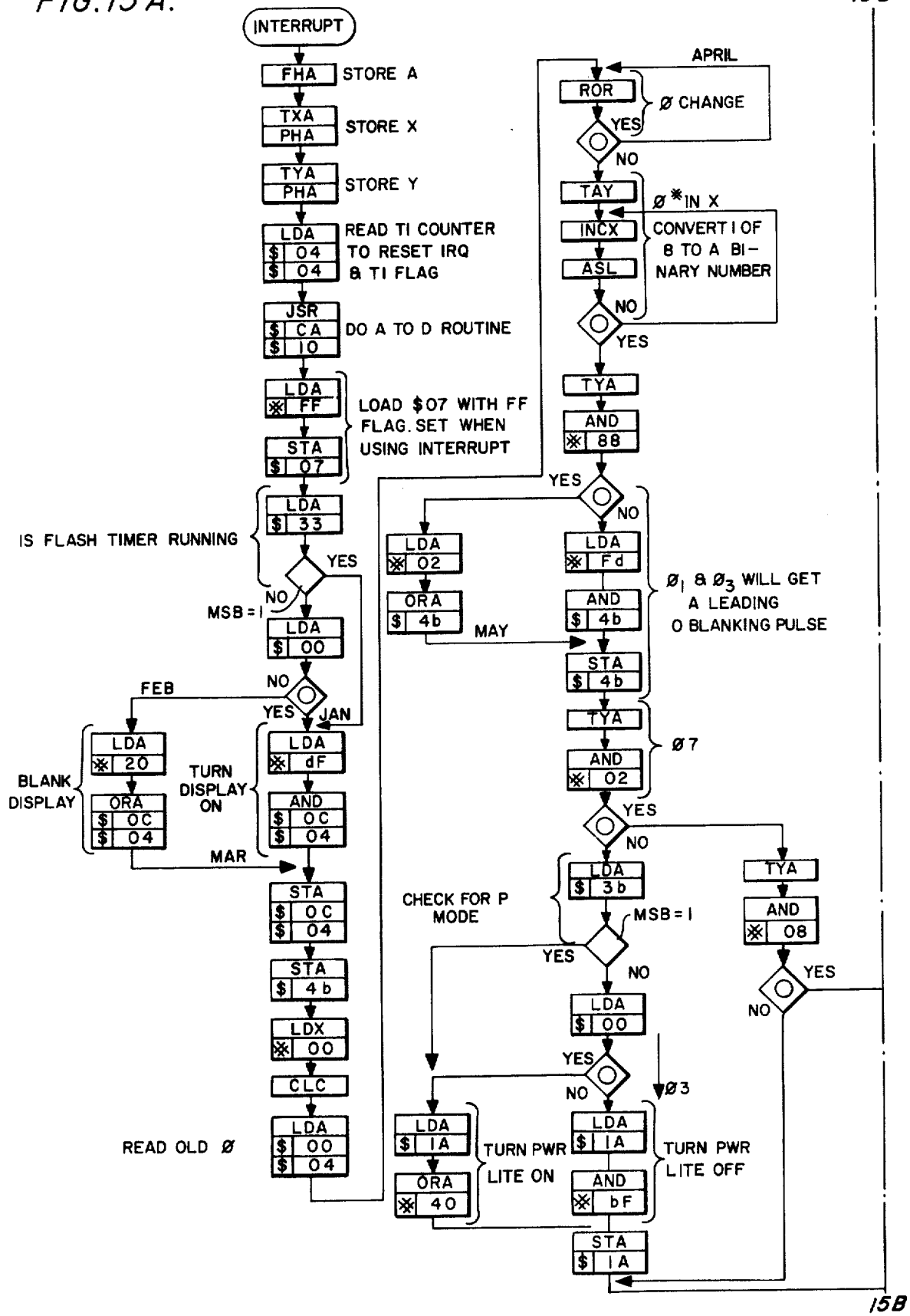
FIGS. 15A, 15B, 15C is a flow chart which illustrates the interrupt routine which is utilized with the main body flow chart shown in FIGS. 6A and 6B.
Figure 15B:
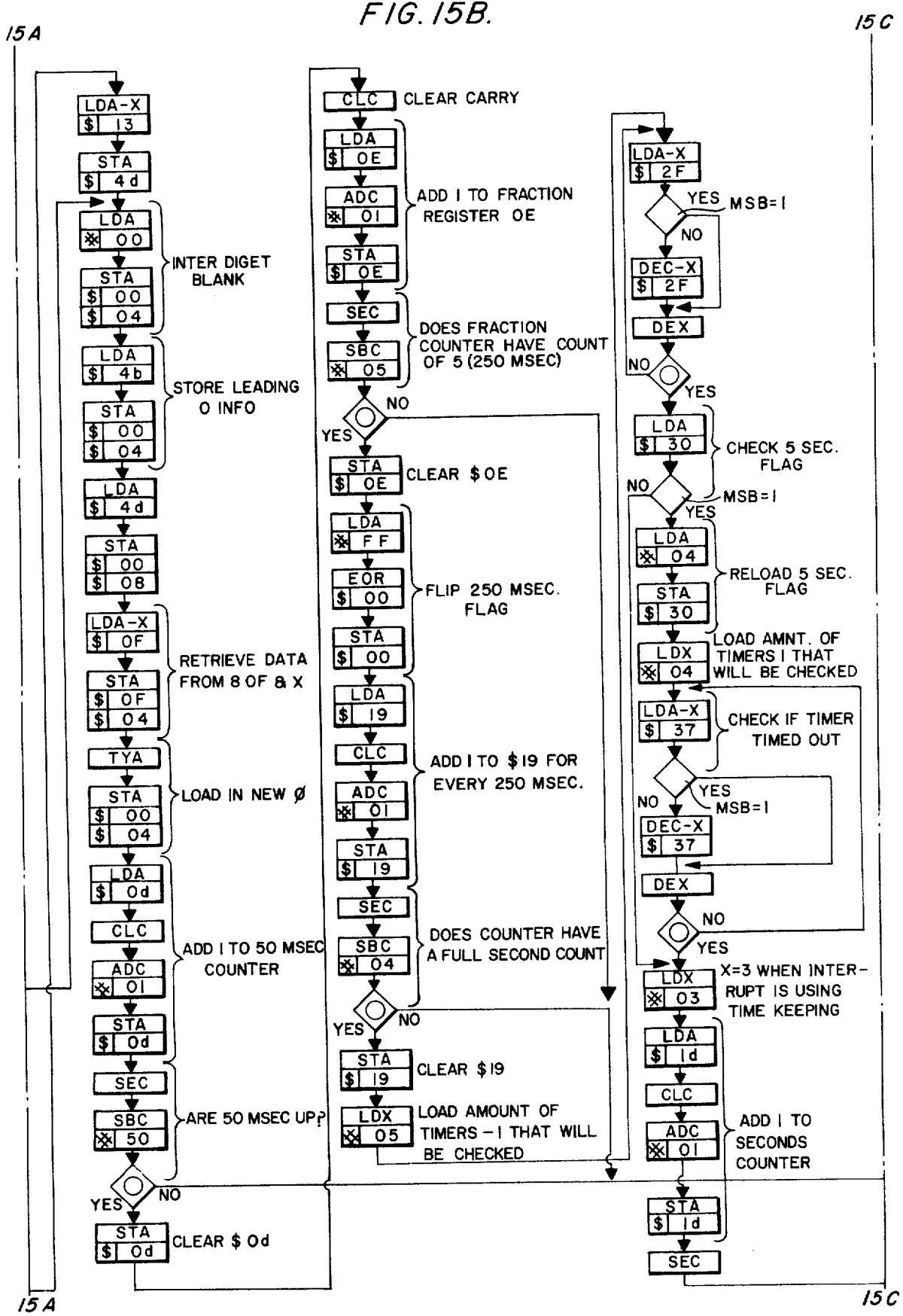
Figure 15C:
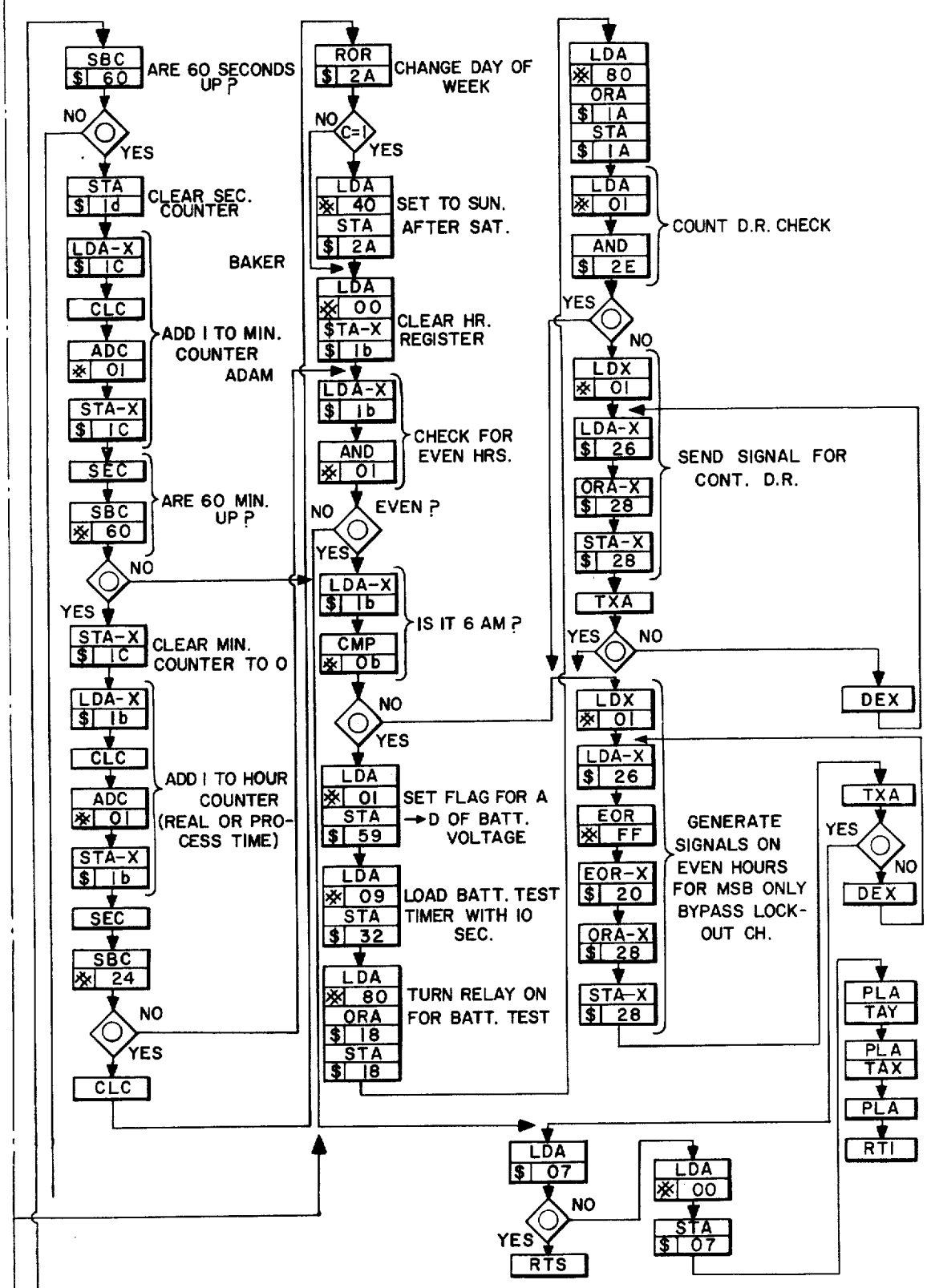
Figure 16A:
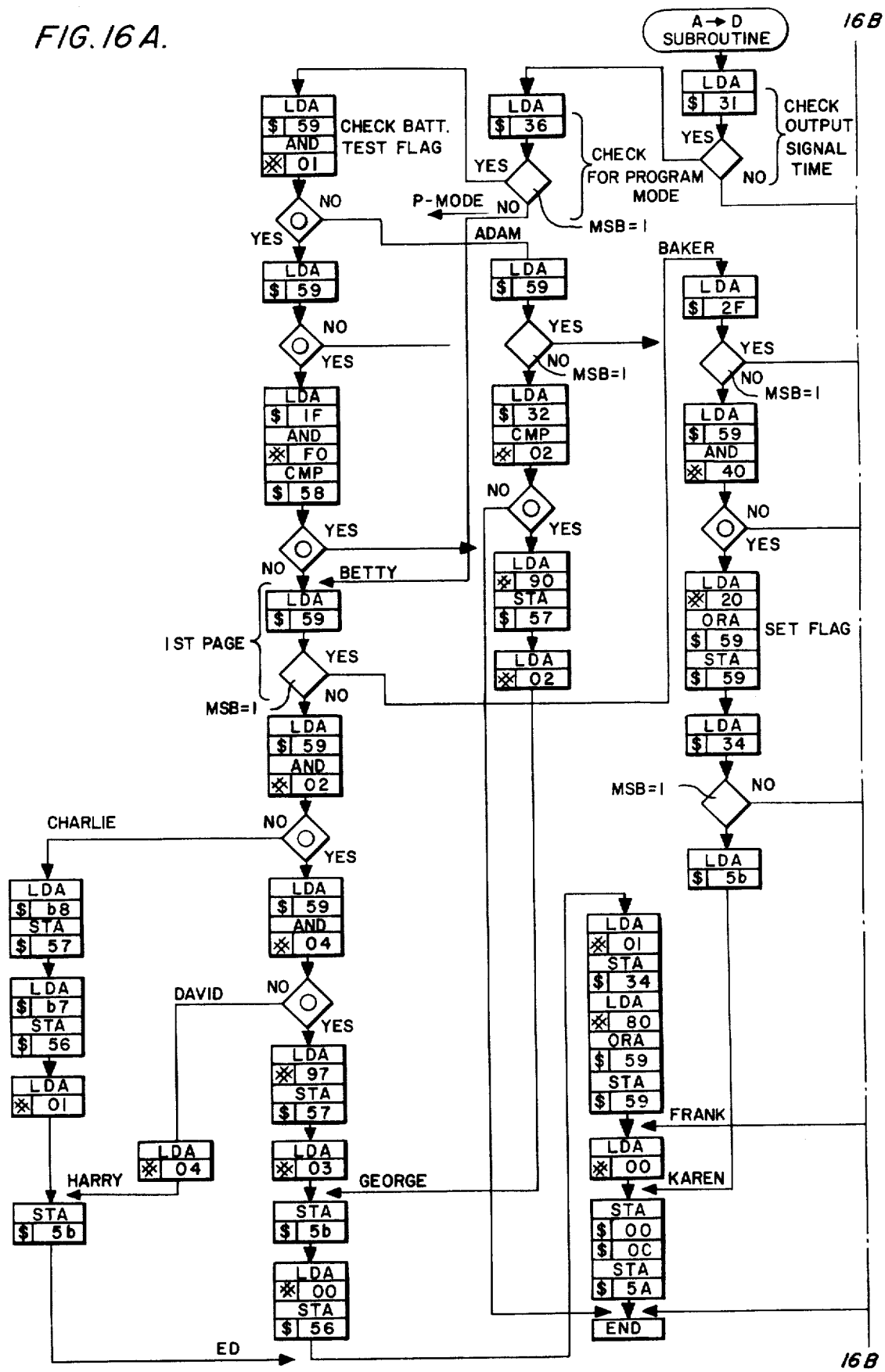
FIGS. 16A and 16B is a flow chart which illustrates the analog to digital conversion sub-routine that is contained within the interrupt sub-routine in the flow chart of FIGS. 15A, 15B and 15C.
Figure 16B:
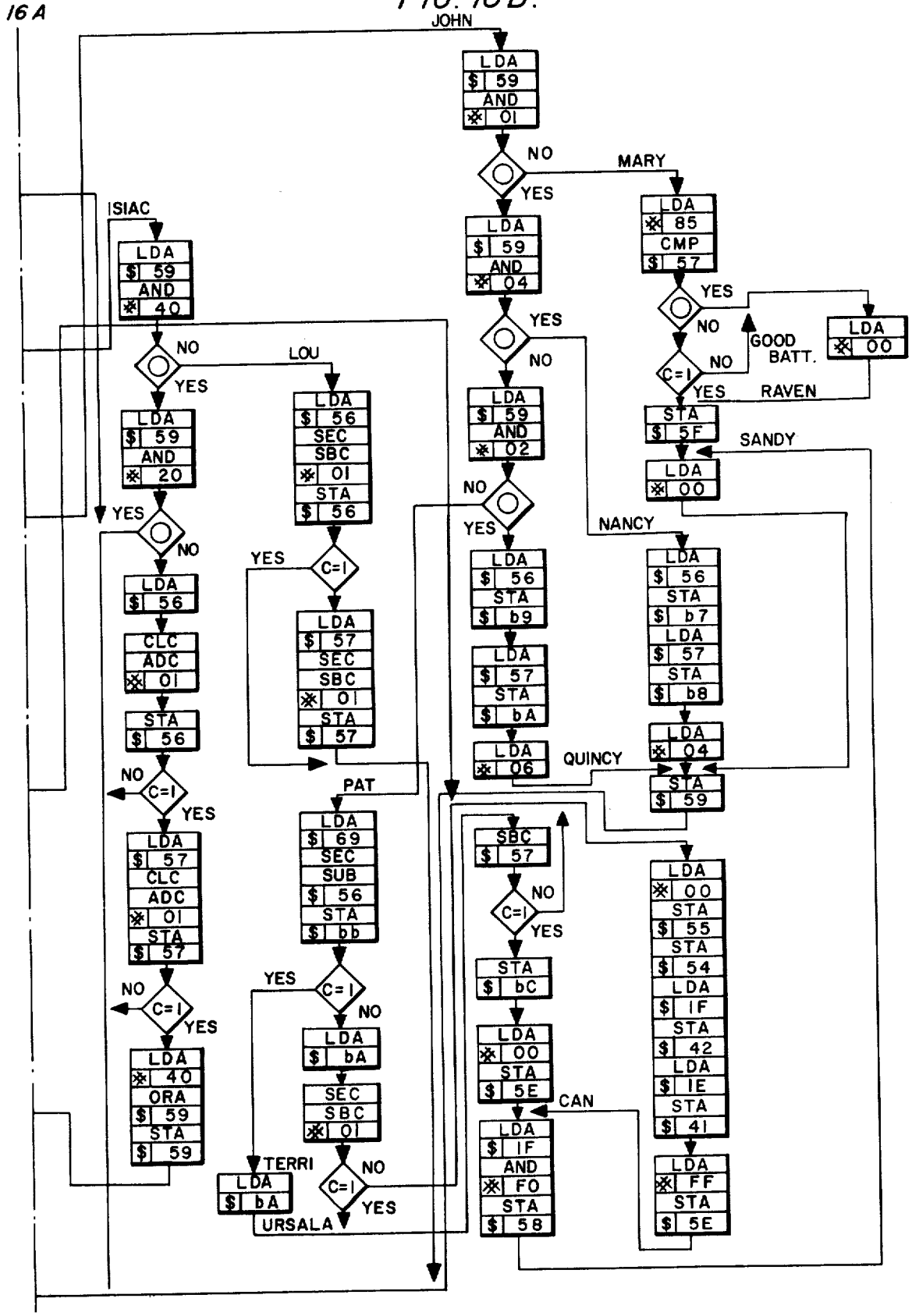

Some of the sub-routines shown generally in the main body flow chart of FIGS. 6A & 6B are shown in detail in the flow charts illustrated in FIGS. 7 through 13. For example, the initialization and the reading of the various switches is shown in detail in FIGS. 7A & 7B, respectively. The checking of AC power and the presence of a shut down signal 86 is illustrated in detail in FIG. 8. The check as to whether the system is in a program mode is illustrated in detail in FIGS. 9A & 9B. The modification of the indication of day, hours, zones and minutes, etc. is illustrated in FIGS. 10A, 10B, 10C and 10D. The generation of data and the processing of signals in carrying out the program is illustrated in detail in FIGS. 11A through 11H. The conversion of a twenty four hour clock signal within the programmed computer to the twelve hour AM/PM clock display 60 on the control panel 52 is illustrated in detail in FIG. 14. The shut down bypass sub-routine is shown in detail in FIG. 13. The portion of the program (not shown in FIGS. 6A & 6B) which interrupts the system to enable the twenty four hour clock to be accurately maintained by the programmed computer is shown in FIGS. 15A through 15C. The portion of the program (not shown in FIGS. 6A & 6B but shown in FIG. 15A) which converts the analogue input information into digital form by means of the dual slope analog to digital convertor 109 is illustrated in FIGS. 16A & 16B. The portion of the program which determines the amount of advance start time when anticipation is selected based upon the difference between the outside temperature and 60° F. is shown in detail in FIGS. 12A & 12B.

We claim:
1. An automatic system for controlling the environmental conditions in a building divided into a plurality of zones comprising:
   at least one power consuming appliance in each zone;
   said building including power means for supplying operating power to said appliances;
   a control station including means for applying onto said power means appliance control signals that include bursts of radio frequency oscillations having a predetermined frequency and a predetermined duration;
   said frequency of said control signals identifying the zone in which said appliances are to be controlled and the duration of said control signals identifying the function to be performed by said appliances in said identified zone;
   a receiver coupled between each said appliance and said power means for receiving said control signals and controlling said appliances in response thereto; and
   each said receiver in a zone being responsive only to the control signals having a frequency associated with the zone in which said receiver is located;

said control station including a programmable computer for generating said control signals to control said appliances in said zones in a predetermined manner;

said control station including manually actuatable means coupled to said computer for overriding the predetermined appliance control data stored in said computer.

2. The system according to claim 1 wherein:

at least some of said appliances include a heating and/or air conditioning unit.

3. The system according to claim 2 further including:

a thermostat coupled to said heating/air-conditioning unit for controlling the operation of said unit when it is turned on in response to a zone control signal.

4. The system according to claim 1 wherein:

said power means includes AC power lines.

5. The system according to claim 1 wherein:

said appliances in a zone are turned off in response to a zone control signal of one duration and are turned on in response to a zone control signal of another duration.

6. The system according to claim 5 wherein:

at least one of said appliances in at least one of said zones includes a heating unit.

7. The system according to claim 6 wherein:

said receiver coupled to said heating unit includes a temperature sensing device for turning said heating unit on when said heating unit has been turned off by said control signals and the temperature at said receiver falls below a predetermined level.

8. The system according to claim 7 wherein:

said temperature sensing device includes a thermistor.

9. The system according to claim 5 further including:

a manually actuatable switch coupled to each said receiver for turning on the associated appliance after the appliance has been turned off in response to a zone control signal.

10. The system according to claim 9 wherein:

once the appliances in a zone are turned off by a control signal, said control station continues to send turn off control signals at regular intervals to said appliances until they are turned on again under the control of said computer.

11. The system according to claim 10 wherein:

appliances turned on by manual actuation of said switch are turned off by a subsequent turn off zone control signal.

12. The system according to claim 1 wherein:

said computer is programmed to generate control signals for selected zones that turn on and subsequently turn off each appliance in a selected zone at substantially the same time for selected day(s) of the week.

13. The system according to claim 12 wherein:

said computer is programmed to turn on and/or to turn off the appliances in different zones at different times during the selected day(s).

14. The system according to claim 12 wherein:

said computer is programmed to keep the appliances in at least one zone continuously on for at least one day of the week.

15. The system according to claim 12 wherein:

said computer is programmed to keep the appliances in at least one zone continuously off for each day of the week.

16. The system according to claim 12 wherein:

the appliances in a zone are off during the unselected day(s) of the week.

17. The system according to claim 12 wherein:

at least some of the appliances in a zone include heating units; and the receivers associated with said heating units include temperature sensing means for turning on said heating units when said heating units have been turned off by said control signals when the temperature falls below a predetermined level.

18. The system according to claim 12 wherein:

said manually actuatable means at said control station enable the data stored in said programmable computer to be overridden for selected days of the week to cause the appliances in said zones to be off for said selected days.

19. The system according to claim 18 wherein:

said manually actuatable means includes a switch for each day of the week;

each said switch containing a first position whereby the appliances in said zones are controlled by the program data in said computer and a second position whereby the appliances in said zones are off.

20. The system according to claim 19 wherein said manually actuatable means further includes:

another switch having a first position whereby the appliances in said zones are controlled by the control signals generated by said program data and/or the position of said day of the week switches and a second position whereby the appliances in said zones are on.

21. The system according to claim 12 further including:

temperature sensing means located outside said building for sensing the outside temperature and generating a signal representative of the outside temperature; and means coupling said temperature signal to said computer;

said computer adapted to adjust the time the appliances in at least some zones are to be turned on by the difference between said outside temperature and a reference temperature represented by a reference signal.

22. The system according to claim 12 wherein:

said control station includes a first mode of operation to enable at least some of said manually actuatable means to override the program stored in said computer and a second mode of operation to enable at least some of said manually actuatable switches to enter turn on and turn off times for at least selected days of the week for at least some of said zones into said programmable computer.

23. The system according to claim 1 further including:

abnormal condition sensing means for generating a signal in response to the occurrence of a predetermined condition; and said computer adapted to turn off the appliances in at least some of said zones in response to the occurrence of said abnormal condition signal.

24. An automatic system for controlling the environmental conditions in a building divided into a plurality of zones comprising:

at least one power consuming appliance in each zone;

at least some of said appliances including a heating-/air conditioning unit;

said building including AC power lines for supplying operating power to said appliances;

a control station including means for applying onto said power lines appliance control signals that include bursts of radio frequency oscillations having a predetermined frequency and a predetermined duration;

said frequency of said control signals identifying the zone in which said appliances are to be controlled and the duration of said control signals determining whether said appliances in said identified zone are to be turned on or off;

a receiver coupled between each said appliance and said power lines for receiving said control signals and turning said appliances on or off in response thereto; and each said receiver being responsive only to the control signals having a frequency associated with the zone in which said receiver is located;

said control station including a programmable computer for enabling the generation of said control signals to control said appliances in said zones in a predetermined manner;

said control station including manually actuatable means coupled to said computer for manually entering appliances control data into said program controlled computer to enable said appliances in said zones to be turned on or off in a desired manner;

said manually actuatable means coupled to said computer also adapted to override the predetermined appliances control data stored in the program of said computer when manually actuated.

25. The system according to claim 24 wherein said control station includes a first mode of operation to enable at least some of said manually actuatable means to override the program stored in said computer for turning said appliances on and/or off and a second mode of operation to enable at least some of said manually actuatable switches to enter turn on and turn off times for selected days of the week for at least some of said zones.

26. The system according to claim 25 wherein:
said computer is programmed to generate control signals for selected zones that turn on and turn off each appliance in a selected zone at substantially the same time for selected day(s) of the week.

27. The system according to claim 26 wherein:
said computer is programmed to turn on and/or to turn off the appliances in different zones at different times during the selected day(s).

28. The system according to claim 26 wherein:
said computer is programmed to keep the appliances in at least one zone continuously on for at least one day of the week.

29. The system according to claim 26 wherein:
said computer is programmed to keep the appliances in at least one zone continuously off for each day of the week.

30. The system according to claim 26 wherein:
the appliances in a zone are off during the unselected day(s) of the week.

31. The system according to claim 26 wherein:
said manually actuatable means at said control station in said first mode of operation enables the program stored in said computer to be overridden for predetermined day(s) of the week to cause the appliances in said zones to be off for the predetermined day(s) selected by actuation of said manually actuatable means.

32. The system according to claim 31 wherein:
said manually actuatable means includes a switch for each day of the week;
each said switch containing a first position whereby the appliances in said zones are controlled by the program data in said computer and a second position whereby the appliances in said zones are off.

33. The system according to claim 32 wherein said manually actuatable means further includes:
another switch having a first position whereby the appliances in said zones are controlled by the control signals generated by said program data and/or the position of said day of the week switches and a second position whereby the appliances in said zones are on.

34. The system according to claim 24 further including:
a manually actuatable switch coupled to each said receiver for turning on the associated appliance after the appliance has been turned off in response to a said zone control signal.

35. The system according to claim 34 wherein:
appliances turned on by actuation of said switch are turned off by a subsequent turn off zone control signal.

36. The system according to claim 24 further including:
a thermostat coupled to said heating/air conditioning unit for controlling the operation of said unit when it is turned on in response to a zone control signal.

37. The system according to claim 24 wherein:
said receiver coupled to said heating/air-conditioning unit includes a temperature sensing device for turning said unit on to provide heat when said unit has been turned off by said control signals and the temperature at said receiver falls below a predetermined level.

38. The system according to claim 37 wherein:
said receiver is an integral part of each said appliance.

39. The system according to claim 24 further including:
temperature sensing means located outside said building for sensing the outside temperature and generating a signal representative of the outside temperature; and
means coupling said temperature signal to said computer;
said computer adapted to adjust the time said heating/air conditioning units in at least some zones are to be turned on by the difference between said outside temperature and a reference temperature represented by a reference signal.

40. An automatic system for controlling the environmental conditions in a building divided into a plurality of zones comprising:
at least one power consuming appliance in each zone;
at least one said appliance including a heating/air conditioning unit;
said building including power lines for supplying operating power to said AC appliances;
a control station including means for applying on said power lines appliance control signals that include bursts of radio frequency oscillations having a predetermined frequency and a predetermined duration;

said frequency of said control signals identifying the zone in which said appliances are to be controlled and the duration of said control signals determining whether said appliances in said identified zone are to be turned on or off;

a receiver coupled between each appliance and said power line for receiving said control signals and turning said appliances on or off in response thereto;

each said receiver in a zone being responsive only to the control signals having a frequency associated with the zone in which said receiver is located;

said control station including a programmable computer for enabling the generation of said control signals to operate the appliances in said zones in a predetermined manner; and temperature sensing means for producing a signal that is indicative of the temperature outside said building; and means coupling said outside temperature signal to said computer;

said computer adapted to alter the predetermined turn on time of at least some of said heating/air conditioning units in response to the difference between the outside temperature and a reference temperature.

41. The system according to claim 40 wherein
said temperature sensing means includes a thermistor; and
analog to digital conversion means are coupled between said temperature sensor and said computer.

42. The system according to claim 40 wherein:
said receiver coupled to said heating/air conditioning unit includes a temperature sensing device for turning said unit on to provide heat when said unit has been turned off by said control signals and the temperature at said receiver falls below a predetermined level.

43. The system according to claim 40 further including:
a manually actuatable switch coupled to each said receiver for turning on the associated appliance after the appliance has been turned off in response to a zone control signal.

44. The system according to claim 40 wherein:
said computer is programmed with data to generate control signals for selected zones that turn on and turn off each appliance in a selected zone at substantially the same time for selected day(s) of the week.

45. The system according to claim 44 wherein:
the appliances in a zone are off during the unselected day(s) of the week.

46. The system according to claim 40 wherein:
said computer is programmed to turn on and/or to turn off the appliances in different zones at different times during the selected day(s).

47. The system according to claim 40 wherein:
said computer is programmed to keep the appliances in at least one zone continuously on for at least one day of the week.

48. The system according to claim 40 wherein:
said computer is programmed to keep the appliances in at least one zone continuously off for each day of the week.

49. The system according to claim 40 wherein:
said control station includes manually actuatable means coupled to said computer for enabling the program stored in said computer to be overridden for certain days of the week to cause the appliances of said zones to be off for said certain day(s) of the week selected by actuation of manually actuatable means.

50. The system according to claim 49 wherein:
said manually actuatable means includes a switch for each day of the week;
each said switch containing a first position whereby the appliances in said zones are controlled by the data in said programmed computer and a second position whereby the appliances in said zones are off.

51. The system according to claim 50 wherein said manually actuatable means further includes:
another switch having a first position whereby the appliances in said zones are controlled by the control signals generated by said program data and/or the position of said day of the week switches and a second position whereby the appliances in said zones are on.

52. The system according to claim 49 wherein:
said control station includes a first mode of operation to enable at least some of said manually actuatable means to override the program stored in said computer and a second mode of operation to enable at least some of said manually actuatable switches to enter turn on and turn off times for at least selected day(s) of the week for at least some of said zones into the program of said computer.

* * * * *